(12) United States Patent
Lee et al.

(10) Patent No.: US 10,944,707 B2
(45) Date of Patent: Mar. 9, 2021

(54) METHOD, SYSTEM AND RECORDING MEDIUM FOR PROVIDING VIDEO CONTENTS IN SOCIAL PLATFORM AND FILE DISTRIBUTION SYSTEM

(71) Applicant: LINE Corporation, Tokyo (JP)

(72) Inventors: Jung Min Lee, Seongnam-si (KR); Eun Ae Park, Seongnam-si (KR); A Reum Kim, Seongnam-si (KR)

(73) Assignee: Line Corporation, Tokyo (JP)

( * ) Notice: Subject to any disclaimer, the term of this patent is extended or adjusted under 35 U.S.C. 154(b) by 448 days.

(21) Appl. No.: 14/838,960

(22) Filed: Aug. 28, 2015

(65) Prior Publication Data

US 2016/0094501 A1    Mar. 31, 2016

(30) Foreign Application Priority Data

Sep. 26, 2014  (KR) .................. 10-2014-0129275
Sep. 26, 2014  (KR) .................. 10-2014-0129276
(Continued)

(51) Int. Cl.
*H04L 12/58* (2006.01)
*G06Q 50/00* (2012.01)

(52) U.S. Cl.
CPC ............ *H04L 51/10* (2013.01); *G06Q 50/01* (2013.01); *H04L 51/04* (2013.01); *H04L 51/32* (2013.01)

(58) Field of Classification Search
CPC ........... H04N 21/4312; H04N 21/4788; H04N 21/4858
See application file for complete search history.

(56) References Cited

U.S. PATENT DOCUMENTS 9,645,996 B1 * 5/2017 Ledet .................. G06F 17/2755
2003/0097301 A1 * 5/2003 Kageyama ........ G06F 17/30265
705/14.52
(Continued)

FOREIGN PATENT DOCUMENTS

JP    2008-250578 A    10/2008
JP    2008278088 A    12/2008
(Continued)

OTHER PUBLICATIONS

Office Action for Japanese Patent Application No. 2015-187898 dated Aug. 30, 2016.
(Continued)

*Primary Examiner* — William G Trost, IV
*Assistant Examiner* — Christopher P Cadorna
(74) *Attorney, Agent, or Firm* — Harness, Dickey & Pierce, P.L.C.

(57) ABSTRACT

A contents providing system for providing video contents through a social service includes a memory storing computer-readable instructions; and one or more processors configured to execute the instructions to, manage information on a social network between users of the social service; and provide a together-watching function if at least one conversation partner is selected from a list of different persons related to a user according to the social network, wherein the together-watching function is a function that provides simultaneous display of a conversation screen with the at least one conversation partner and a video reproduction screen in which the video contents are reproduced.

33 Claims, 28 Drawing Sheets

(30) Foreign Application Priority Data

Sep. 26, 2014 (KR) ........................ 10-2014-0129277
Sep. 26, 2014 (KR) ........................ 10-2014-0129278
Sep. 26, 2014 (KR) ........................ 10-2014-0129280

(56) References Cited

U.S. PATENT DOCUMENTS

| | | | |
|---|---|---|---|
| 2009/0235150 A1* | 9/2009 | Berry | G06F 16/48 |
| | | | 715/205 |
| 2009/0274437 A1* | 11/2009 | Stiers | H04N 5/76 |
| | | | 386/239 |
| 2012/0232996 A1* | 9/2012 | Scott | G06Q 30/02 |
| | | | 705/14.64 |
| 2012/0236201 A1* | 9/2012 | Larsen | H04N 21/439 |
| | | | 348/468 |
| 2013/0012245 A1* | 1/2013 | Choi | H04M 3/42382 |
| | | | 455/466 |
| 2013/0091012 A1* | 4/2013 | Liberty | G06Q 30/0241 |
| | | | 705/14.51 |
| 2013/0332469 A1* | 12/2013 | Nakamura | G06F 17/30283 |
| | | | 707/748 |
| 2014/0317660 A1* | 10/2014 | Cheung | H04N 21/6175 |
| | | | 725/44 |

FOREIGN PATENT DOCUMENTS

| | | |
|---|---|---|
| JP | 2013-046198 A | 3/2013 |
| JP | 2014-505280 A | 2/2014 |
| JP | 5439620 B1 | 3/2014 |
| JP | 2014-510425 A | 4/2014 |
| WO | WO-2008/012900 A1 | 1/2008 |
| WO | WO-2012/057509 A2 | 5/2012 |
| WO | WO-2012/092247 A1 | 7/2012 |

OTHER PUBLICATIONS

Office Action dated May 28, 2019, issued in corresponding Japanese Patent Application No. 2016-234731.

* cited by examiner

METHOD, SYSTEM AND RECORDING MEDIUM FOR PROVIDING VIDEO CONTENTS IN SOCIAL PLATFORM AND FILE DISTRIBUTION SYSTEM

CROSS-REFERENCE TO RELATED APPLICATIONS

A claim for priority under 35 U.S.C. § 119 is made to Korean Patent Applications No. 10-2014-0129275, No. 10-2014-0129276, No. 10-2014-0129277, No. 10-2014-0129278, No. 10-2014-0129280, filed on Sep. 26, 2014, in the Korean Intellectual Property Office, the entire contents of each of which are incorporated herein by reference.

BACKGROUND

At least some example embodiments of the inventive concepts relate to a contents platform for providing video contents.

A dramatic increase in high-speed communication network users may enable new service development and diversification of service items using a communication network. The most common service of services using a communication network may be a video provision service.

Conventional techniques include a technique for providing a video link service capable of allowing the viewing of a linked video on internet communications network using a mobile communication terminal while moving.

SUMMARY

At least some example embodiments of the inventive concepts are directed to providing a contents providing method and system capable of providing a video service associated with a social network through a video distribution platform constructed on a social platform.

Also, at least some example embodiments of the inventive concepts are directed to providing a contents providing method and system capable of sharing video contents based on a social network.

Furthermore, at least some example embodiments of the inventive concepts are directed to providing a contents providing method and system capable of recommending video contents based on the levels of closeness and reaction.

At least some example embodiments of the inventive concepts are directed to providing a contents providing method and system capable of providing a variety of benefit information with regard to a purchase model of video contents.

At least some example embodiments of the inventive concepts are directed to providing a contents providing method and system capable of inducing traffic of a new model in connection with associated contents of video contents.

At least some example embodiments of the inventive concepts are directed to providing a contents providing method and system capable of providing video contents including a multi-track video on a social platform.

At least some example embodiments of the inventive concepts are directed to providing a contents providing method and system, capable of freely connecting a chatting and a video by combining a social service and a video service.

According to at least one example embodiment of the inventive concepts, a contents providing system for providing video contents through a social service, the contents providing system includes a memory storing computer-readable instructions; and one or more processors configured to execute the instructions to manage information on a social network between users of the social service; and provide a together-watching function if at least one conversation partner is selected from a list of different persons related to a user according to the social network, wherein the together-watching function is a function that provides simultaneous display of a conversation screen with the at least one conversation partner and a video reproduction screen in which the video contents are reproduced.

According to at least one example embodiment of the inventive concepts, a contents providing method implemented with a computer includes displaying a list of different persons related to a user according to a social network of a social service, at a terminal of the user; sending a selection of at least one conversation partner in the list of different persons, from the terminal of the user; and displaying a conversation screen with the at least one conversation partner at the terminal of the user in response to the received selection, wherein a content platform providing video contents is constructed on a social platform providing the social service, and wherein in the displaying includes simultaneously displaying the conversation screen and a video reproduction screen, in which video contents selected by the user is reproduced, at the terminal of the user.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
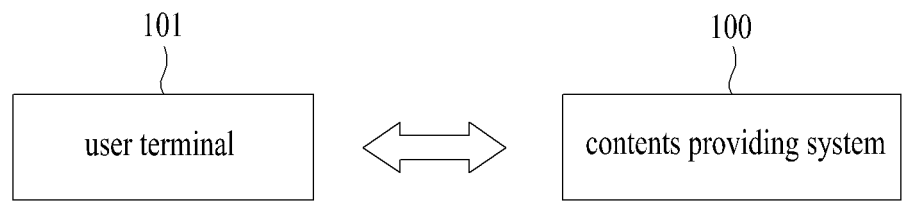
FIG. 1 is a diagram illustrating a relationship between a user terminal and a contents providing system, according to at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Example embodiments disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA).

Below, at least one example embodiment of the inventive concepts will be described with reference to accompanying drawings.

At least some example embodiments of the inventive concepts relate to a contents platform for providing video contents, and in particular, to construct a platform designed or, alternatively, optimized for distribution and consumption of video contents using a social platform.

In this specification, a social service may encompass all formats of services which allow users to form a social network being a human network on an internet, such as a messenger service, a social network service (SNS), a community service, and the like, and help manage and exchange information of users.

Below, an embodiment on a contents platform for providing video contents through a messenger service will be described using a messenger service as an example of a social service.

FIG. 1 is a diagram illustrating a relationship between a user terminal and a contents providing system, according to at least one example embodiment of the inventive concepts. In FIG. 1, there are illustrated a contents providing system 100 and a user terminal 101. In FIG. 1, an arrow may mean that data is transmitted and received between the contents providing system 100 and the user terminal 101 through a wired/wireless network.

The user terminal 101 may refer to all terminal devices capable of connecting to a web/mobile site associated with the contents providing system 100 or installing and executing a service-dedicated application, such as a PC, a notebook, a smart phone, a tablet, a wearable computer, and the like. Here, under the control of a web/mobile site or the dedicated application, the user terminal 101 may perform an overall operation of a service including service screen construction, data input, data transmission and reception, data storage, and the like. The user terminal 101 may include one or more circuits or circuitry (e.g., hardware) specifically structured to carry out some or all of the operations described herein as being performed by the memory controller. The user terminal 101 may include a memory and one or more processors executing computer-readable code (e.g., software) that is stored in the memory and includes instructions corresponding to some or all of the operations described herein as being performed by the user terminal 101. The user terminal 101 may be implemented by, for example, a combination of the above-referenced hardware and software.

The contents providing system 100 may act as a contents platform for providing video contents to the user terminal 101 being a client. For example, the contents providing system 100 may be implemented on a messenger platform for providing a messenger service and may distribute video contents based on a social network of a messenger. The contents providing system 100 may be implemented in such a way that the contents providing system 100 is included in a platform of a messenger server (not illustrated). However, the scope and spirit of at least some example embodiments of the inventive concepts may not be limited thereto. For example, the contents providing system 100 may be implemented with a system independent of the messenger server so as to distribute video contents in connection with the messenger server at a messenger. The contents providing system 100 may include one or more circuits or circuitry (e.g., hardware) specifically structured to carry out some or all of the operations described herein as being performed by the memory controller. The contents providing system 100 may include a memory and one or more processors executing computer-readable code (e.g., software) that is stored in the memory and includes instructions corresponding to some or all of the operations described herein as being performed by the user terminal 101. The user terminal 101 may be implemented by, for example, a combination of the above-referenced hardware and software.

Figure 2:
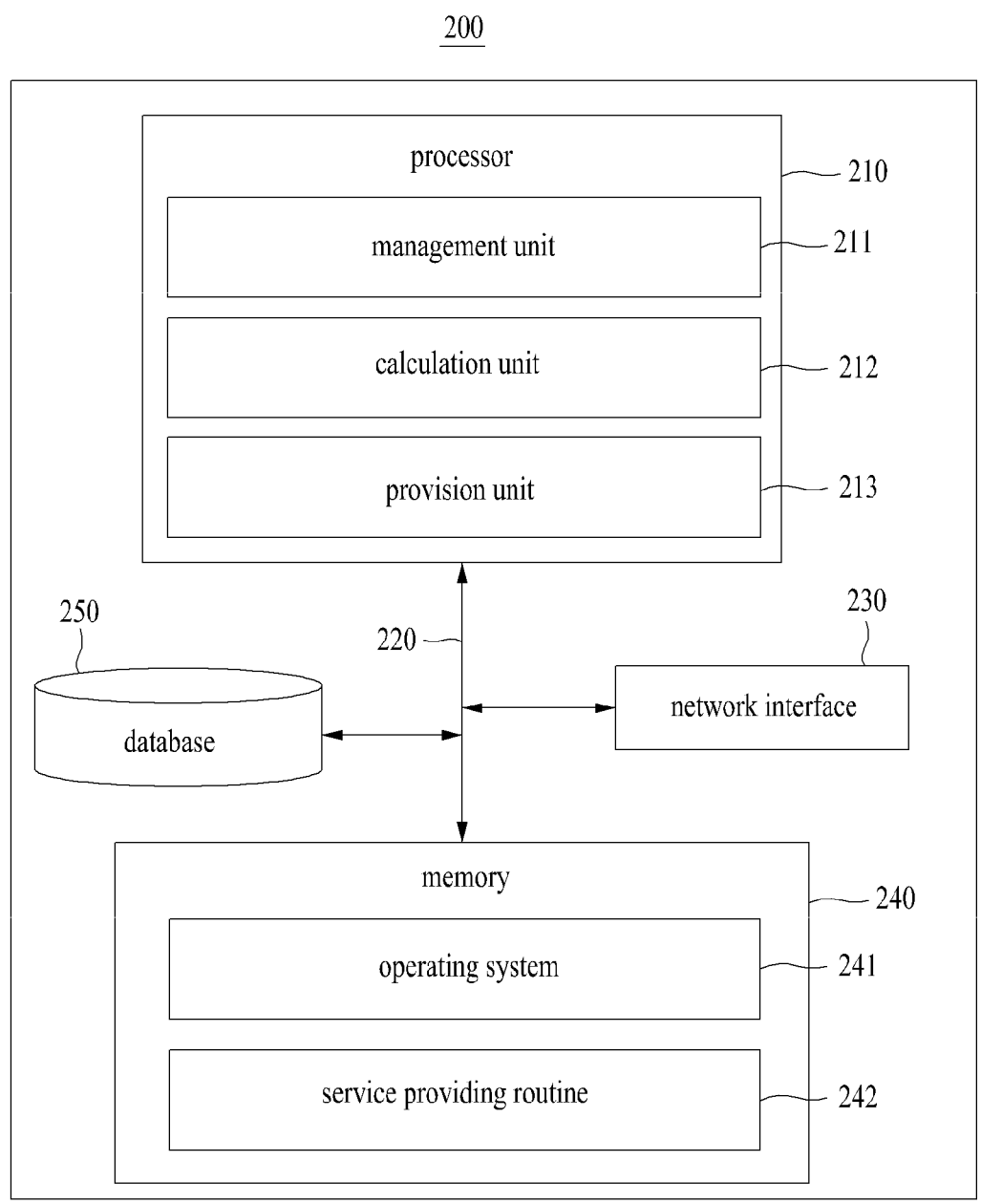
FIG. 2 is a block diagram illustrating an internal configuration of a contents providing system, according to at least one example embodiment of the inventive concepts.
Figure 3:
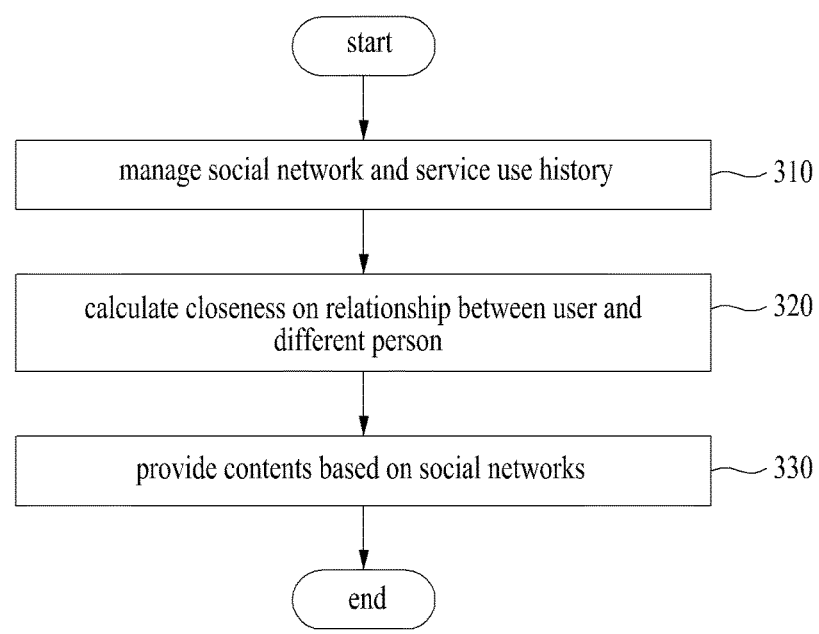
FIG. 3 is a flow chart illustrating a contents providing method according to at least one example embodiment of the inventive concepts.

FIG. 2 is a block diagram illustrating an internal configuration of a contents providing system, according to at least one example embodiment of the inventive concepts, and FIG. 3 is a flow chart illustrating a contents providing method according to at least one example embodiment of the inventive concepts.

As illustrated in FIG. 2, a contents providing system 200 according to at least one example embodiment of the inventive concepts may include a processor 210, a bus 220, a network interface 230, a memory 240, and database 250. The memory 240 may include an operating system 241 and a service providing routine 242. The processor 210 may include a management unit 211, a calculation unit 212, and a provision unit 213. In at least some example embodiments, the contents providing system 200 may include additional components other than those shown in FIG. 2. According to at least one example embodiment, the contents providing system 100 may have the same structure and operation as that described herein with respect to the contents providing system 200.

The memory 240 may be a computer-readable recording medium and may include a random access memory (RAM), a read only memory (ROM), and a permanent mass storage device such as a disk drive. Stored in the memory 240 is program code for the operating system 241 and the contents providing routine 242 that is executable by the processor 210. Such software components may be loaded from a computer-readable recording medium, which is independent of the memory 240, using drive mechanism (not illustrated). The computer-readable recording medium independent of the memory 240 may include a computer-readable recording medium, such as a floppy drive, a disk, a tape, a DVD/CD-ROM drive, a memory card, or the like. In other embodiments, software components may be loaded on the memory 240 through the network interface 230, not the computer-readable recording medium.

The bus 220 may allow communication and data transmission to be performed between components of the contents providing system 200. The bus 220 may be implemented using, for example, a high-speed serial bus, a parallel bus, a storage area network (SAN), and/or any other appropriate communication technology.

The network interface 230 may be a computer hardware component for connecting the contents providing system 200 to a computer network. The network interface 230 may connect the contents providing system 200 to a computer network through a wired or wireless connection.

The database 250 may store and retain all information needed for a service and may be implemented as a database including contents to be distributed, a database including social network information such as personal connections information made at a messenger, a database including service use histories of users of a service, a database including advertisement information, and the like. Here, the contents to be distributed may basically mean video contents. Furthermore, the contents to be distributed may include all sorts of contents capable of being distributed in connection with video contents. In FIG. 2, according to at least one example embodiment of the inventive concepts, the contents providing system 200 includes the database 250. However, the scope and spirit of the present disclosure may not be limited thereto. For example, the database 250 may be omitted according to a system implementation manner or an environment, or the whole or a portion of the database 250 may be provided as external database implemented on a separate system.

The processor 210 may process an instruction of a computer program by performing a basic arithmetic operation, a logic operation, and an input/output operation of the contents providing system 200. The memory 240 or the network interface 230 may provide the instruction to the processor 210 through the bus 220. The processor 210 may be configured to execute program code for the management unit 211, the calculation unit 212, and the provision unit 213. The program code may be stored at a record device such as the memory 240.

The management unit 211, the calculation unit 212, and the provision unit 213 may be configured to perform steps of FIG. 3.

In step 310, the management unit 211 may manage video contents to be provided and background information for providing a service. For example, the management unit 211 may manage video contents to be distributed at a social network-based contents distribution environment. Furthermore, the management unit 211 may manage, as additional content, associated contents capable of being distributed in connection with the video contents.

For example, the management unit 211 may manage an image-type expression, used for communication between users at a social service, in connection with the video contents. Here, the image-type expression may encompass all formats of pictographs, which are used to express user emotion or intention on a messenger instead of inputting a text directly, such as stickers, graphic emoticons, emojis, flashcon, and the like expressed in various forms of images. In particular, the image-type expression may be produced using an image associated with corresponding contents with respect to associated video contents. For example, the image-type expression may be created by making an image about a character, a scene, a theme, lines, and the like of video contents. Below, a sticker will be described as a representative example of the image-type expression.

As another example, the management unit 211 may manage an official account used to provide a variety of information, associated with video contents at a social service, in connection with corresponding video contents. Here, the official account may mean an account having the format of bot providing a variety of information associated with brand, enterprise, artist, entertainer, media, and the like, on a messenger and may be opened and recommended to all users using the messenger. Furthermore, the official account may be automatically recommended to a user using a messenger based on a condition. For example, the official account of video contents may be automatically recommended when a user reproduces video contents or checks detailed information on the video contents.

As still another example, the management unit 211 may manage product advertisement associated with video contents in connection with corresponding video contents. Here, the product advertisement may mean advertisement for promoting products appearing at an associated video or products associated with a character, a scene, a theme, lines, and the like of an associated video, such as product placement (PPL) and the like.

The management unit 211 may perform overall management of a contents platform including contents registration of a contents provider with respect to video contents and additional contents associated with the video contents, charging and revenue management according to providing, displaying, and selling of content, and the like. Here, the management unit 211 may include an overall management role of an advertisement platform including advertisement registration of an advertiser, charging and revenue management according to providing or displaying of advertisement, and the like. Furthermore, in video contents, additional contents (at least one of a sticker, an official account, or product advertisement) may be connected with respect to each video and may be registered and managed by the set.

According to at least some example embodiments, video contents (hereinafter referred to as a "multi-track video")

made of a multi-track video may be included and managed in a distribution target. The multi-track video may be formed of image tracks produced in various versions based on a character, a situation, a site, a camera angle, and the like and may be provided in the format of service which allows a user to select and watch a desired one of image tracks. For example, the management unit 211 may store and retain N image tracks per video contents to provide a multi-track video allowing a user to watch one image in various tracks.

The management unit 211 may manage information on a social network on a messenger, service use histories of users on a messenger service and a video service, and the like. For example, the management unit 211 may manage all social graph information such as information on each of users working on a messenger-based social network, personal connections information in which a relationship among users (e.g., friends, neighbors, favorites, and the like) is set, and the like.

Furthermore, the management unit 211 may manage contents use histories on a messenger conversation history of a user, a video watched by a user, a like video, a bookmarked video, a video shared with other users, and the like, based on use logs on a messenger service and a video service.

Also, the management unit 211 may manage a purchasing history of a user on a pay video, a sharing history with any other user, a history associated with a benefit obtained through purchasing of a video, and the like as contents use histories. For example, the management unit 211 may also manage contents use histories on contents purchased by a user, downloaded content, like content, and the like with respect to additional contents associated with video contents. Furthermore, the management unit 211 may manage use histories of respective tracks with respect to a multi-track video. For example, the management unit 211 may manage multi-track use histories on a track watched by a user, a like track, a bookmarked track, a track shared with any other user, and the like.

In step 320, the calculation unit 212 may calculate reference data to be used to provide video contents and additional contents based on a social network on a messenger. For example, the calculation unit 212 may calculate the level of closeness on a relationship between a user and a friend, based on information on a social network on a messenger and a service use history of a different person (hereinafter referred to as "friend") related to a user.

For example, the calculation unit 212 may calculate the level of closeness between a user and a friend using one of an interaction level, a relation level, a recent level, and network similarity or a combination of two or more thereof. Here, the interaction level may be a basic element for calculating the level of closeness. For example, the interaction level may be a measure of how frequently the user and the friend interact with one another. The interaction level may be calculated using at least one of the recent amount of conversation or a conversation frequency. An examples of the recent amount of conversation or the conversation frequency is the number of events in which a user exchanges data or a message with a friend during a recent and constant period, and may be defined by a value obtained by dividing the number of events with a length of the constant period. A type of interaction with a friend may be changed according to a type of social service. The interaction level may be calculated using the following conditions according to an interaction type: a recent visit count, the number of recent replays (or trackback, sympathy writing, or the like), the number of recent regard writing (or messages or the like), and the like. The relationship level may indicate how high the level of relationship between a user and a friend is maintained and may mean whether or not of favorite registration, whether or not of same group member, and the like. The recent level may refer to a point in time when a relationship between a user and a friend is set and may be defined by a value obtained by subtracting a relationship setting date between a user and a friend from a date when the friend is registered at a service. The network similarity may refer to how much personal connections are overlapped between personal connections of the user and personal connections of the friend. For example, the network similarity may be defined by a ratio of the number of friends related to the user to the whole friend list of the friend. Further, according to at least some example embodiments, an element capable of indicating or analyzing a relationship between a user and a friend may be also used to calculate closeness.

Furthermore, the calculation unit 212 may calculate a friend ranking of a user based on the level of closeness on a relationship between a user and a friend. The friend ranking may be used as reference data for recommending content. For example, the friend ranking may be used to decide a top friend list (best friend list) of members having high closeness with a user. Also, the calculation unit 212 may calculate a reaction level (i.e., popularity) on a video provided through a messenger, based on service use histories of a user and friends. For example, a video ranking or a video track ranking may be also calculated according to the reaction level. Likewise, the video ranking or video track ranking may be used as reference data for recommending content. For example, the video ranking or video track ranking may be used to decide a top video list including videos frequently watched by all or a portion of friends of a user. Furthermore, the calculation unit 212 may calculate a ranking of additional contents associated with video contents, based on closeness on a relationship between a user and a friend and a service use history.

According to at least some example embodiments of the inventive concepts, the calculation unit 212 may be omitted from the contents providing system 200.

In step 330, the provision unit 213 may provide video contents based on a social network on a messenger. For example, the provision unit 213 may recommend a video to a user based on the level of closeness on a relationship between a user and a friend and service use histories of friends. For example, the provision unit 213 may extract some of friends of a user in a descending order of the level of closeness and may provide the most watched or the most recently watched video on each of the extracted friends as a recommended video. Also, the provision unit 213 may provide a favorite video obtaining a high reaction level from user friends during a recent constant period, a like video, a bookmarked video, a video shared with any other user(s), and the like as a recommended video. For example, the provision unit 213 may apply the level of closeness to a display reference of a video list. In other words, a video of a video list having an interaction history by a friend of which the level of closeness is high may be displayed at a top end portion of the video list. As other example, the provision unit 213 may provide a service so as to provide a video by the separate contents and to share separate contents through a messenger chart room between a user and a friend. In other words, the provision unit 213 may transmit a video selected by a user to at least one friend selected by the user through a messenger, by the separate content. As still other example, the provision unit 213 may provide a service so as to provide a video list by the contents list and to share the contents list through a messenger chat room between a user and a friend. Likewise, the provision unit 213 may transmit a video list selected by a user to at least one friend selected by the user through a messenger, by the contents list.

The provision unit 213 may provide video contents of a live broadcast program in real time. For example, the provision unit 213 may display information on a social network of a messenger together. For example, the provision unit 213 may provide a concurrent-users list on live broadcast content; if a messenger friend (e.g., a friend on a messenger service) of a user exists in the concurrent-users list, the provision unit 213 may increase a weight to display a friend of a user at a top end portion of the list. For example, the provision unit 213 may display friends of the concurrent-users list in a closeness order. Furthermore, it may be possible to display friends watching the same video at the same time by checking friends watching a video as well as live broadcast.

Below, detailed functions of a contents platform will be described according to various examples of a service screen. The following service screens may be an execution screen of a mobile-dedicated application (or app) or a screen executed at a web/mobile site of a general PC environment.

Below, a function for recommending video contents will be described.

Figure 4:
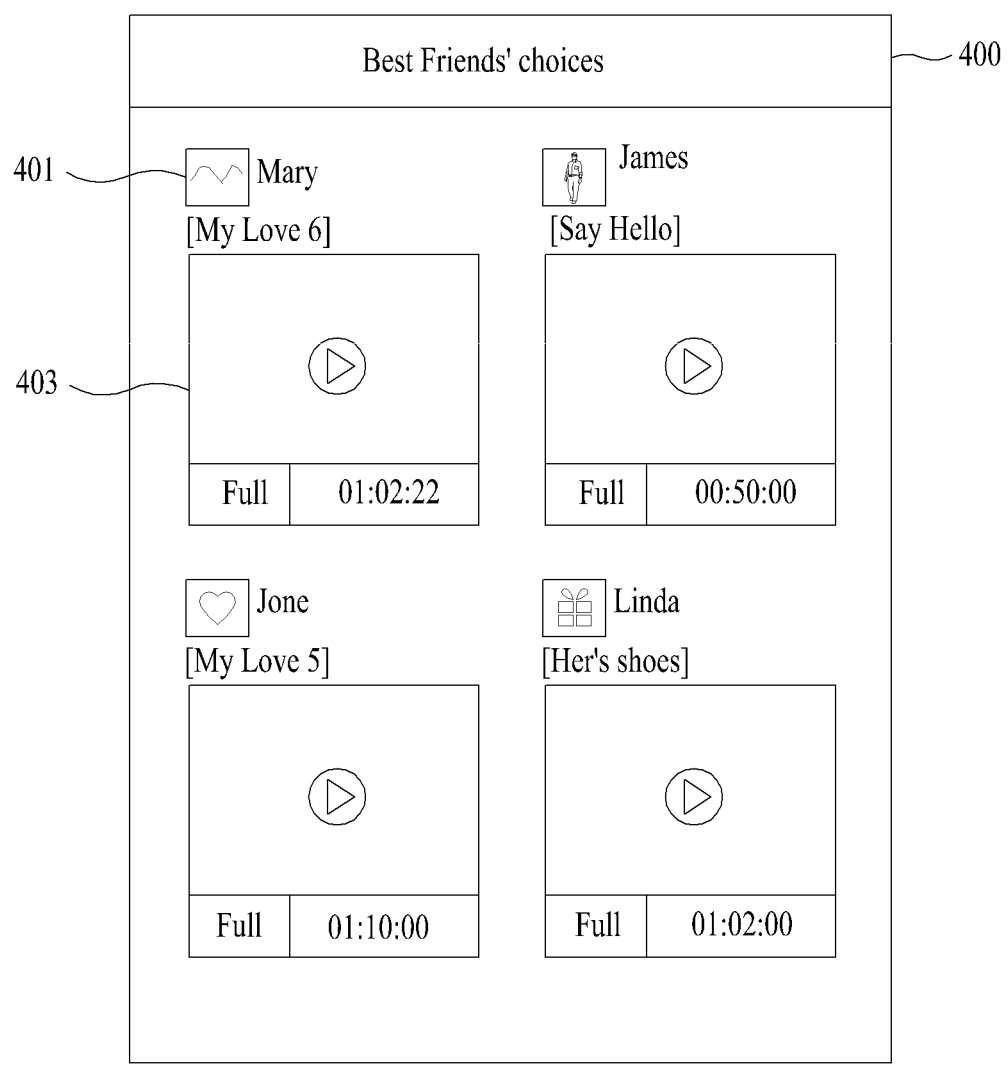
FIGS. 4 to 8 are diagrams illustrating a social network-based contents providing function, according to at least one example embodiment of the inventive concepts.

FIG. 4 is a diagram illustrating a contents recommending screen 400 according to at least one example embodiment of the inventive concepts.

Referring to FIG. 4, the most watched or the recently watched video 403 of each friend 401 having the high level of closeness with a user may be displayed on a contents recommending screen 400 as recommended content. For example, some (e.g., four) of the friends 401 may be selected and displayed in a descending order of closeness with a user. At least one or more of videos 403 may be selected according to a service use history of a corresponding friend. The contents recommending screen 400 may include abstract information (e.g., title, running time, and the like) on each video 403, a menu for selecting or reproducing the video 403, and the like.

Figure 5:
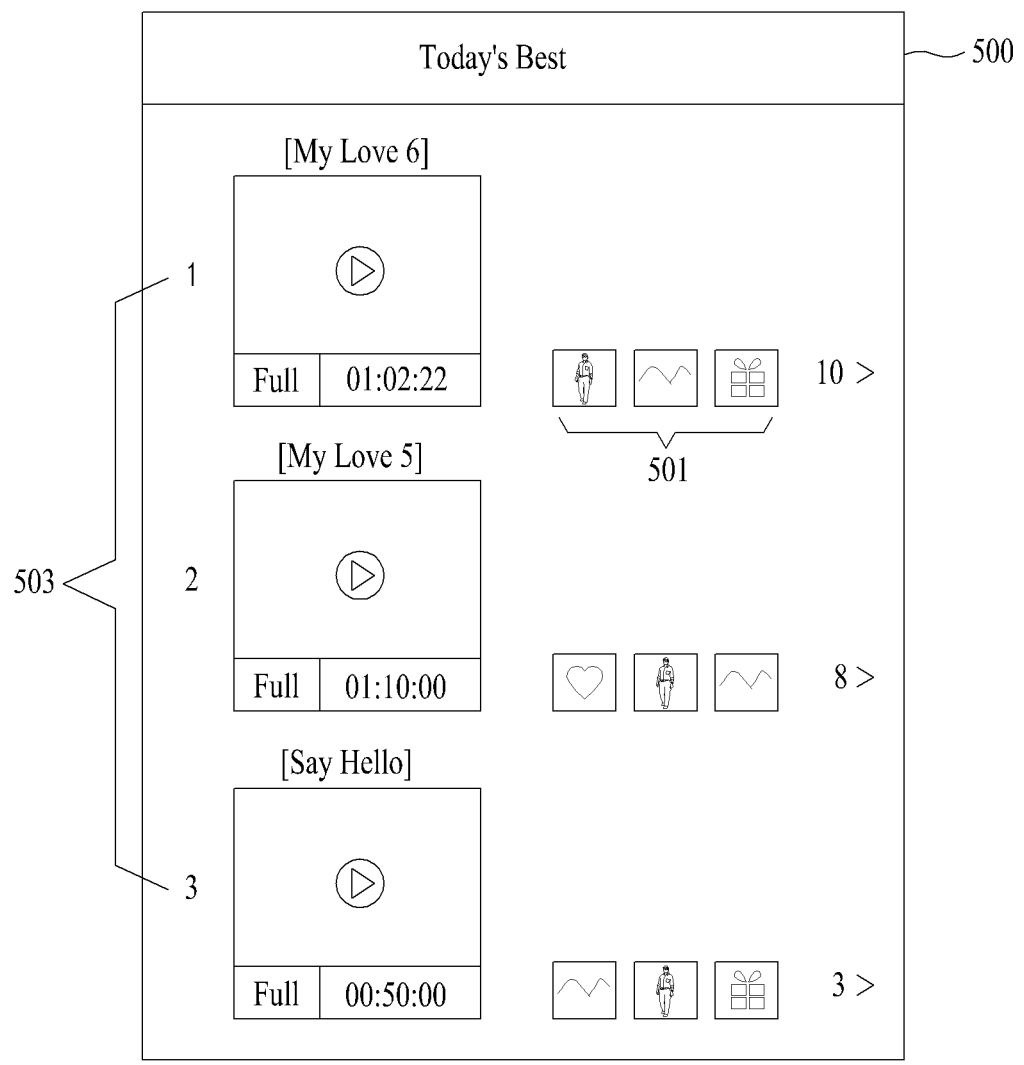

FIG. 5 is a diagram illustrating a contents recommending screen 500 according to at least one example embodiment of the inventive concepts.

Referring to FIG. 5, a list 503 of popular videos recently obtaining high reaction levels from friends of a user may be displayed on a contents recommending screen 500 as recommended content. For example, the popular video list 503 may be determined according to service use histories of friends and may include a video obtaining a high reaction level from friends during a recent constant period, a like video, a bookmarked video, a video shared with any other user(s), and the like. Displayed also on the contents recommending screen 500 is a friend list 501 having an interaction history on each of videos included in the video list 503. Likewise, the contents recommending screen 500 may include abstract information (e.g., title, running time, and the like) on each video included in the video list 503, a menu for selecting or reproducing the video, and the like.

Below, a function for sharing video contents will be described.

Figure 6:
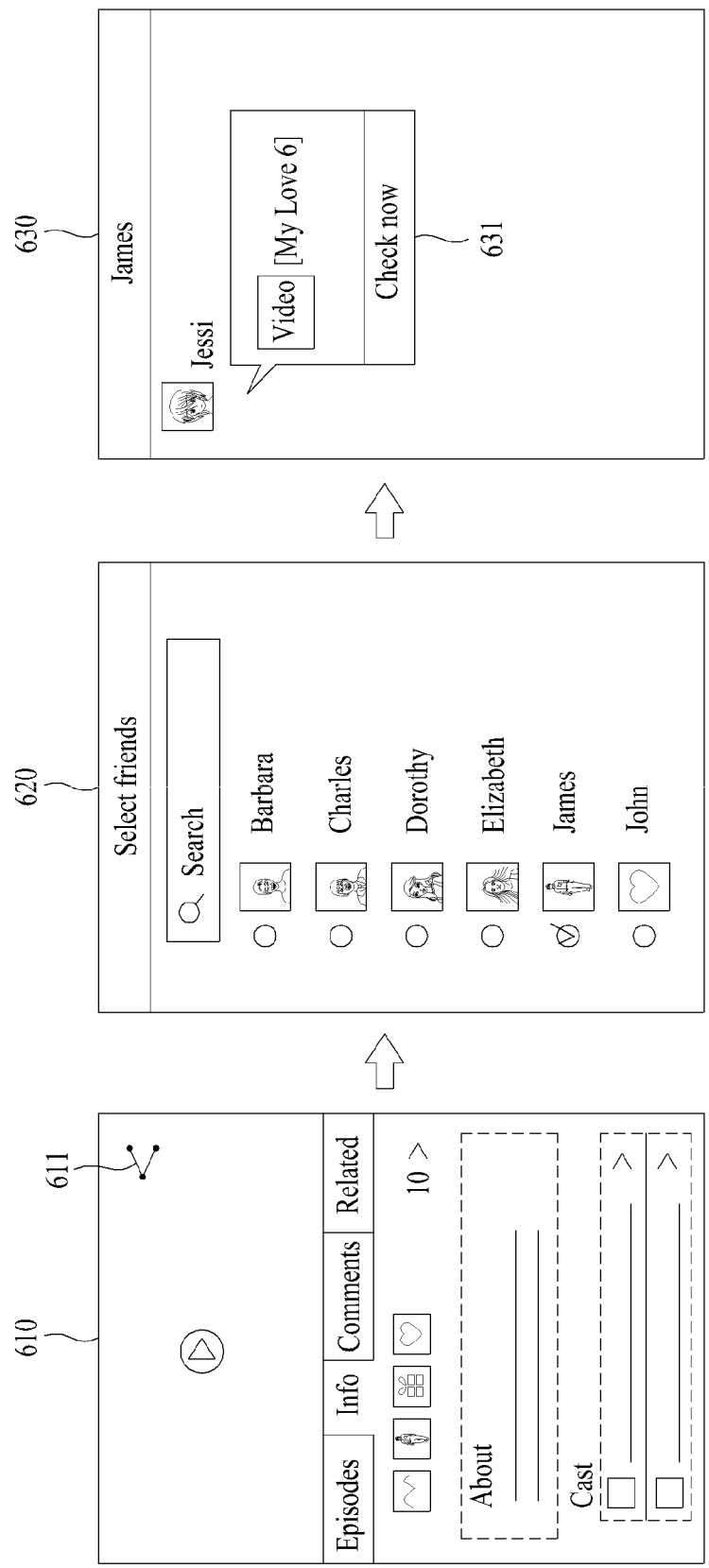

FIG. 6 is a diagram illustrating a function for sharing contents by a unit of separate content.

Referring to FIG. 6, a video screen 610 where a specific video is selected or reproduced may include a sharing menu 611 for sharing a corresponding video with a friend. If a user selects the sharing menu 611 of the video screen 610, a video provided on the video screen 610 may be selected as a sharing target, and the video screen 610 may be switched into a messenger friend list screen 620 for selecting at least one messenger friend. For example, a video corresponding to a sharing target may be selected through a service screen, which allows a video to be selectable by the separate content, as well as the video screen 610. If a user selects at least one friend from the messenger friend list screen 620, a video to be shared may be transmitted to the selected friend through a messenger service. A sharing message 631 on a video which a user intents to share may be displayed on a messenger conversation screen 630 between a user and a friend. For example, the sharing message 631 may include a link which allows a friend to access a corresponding video.

Figure 7:
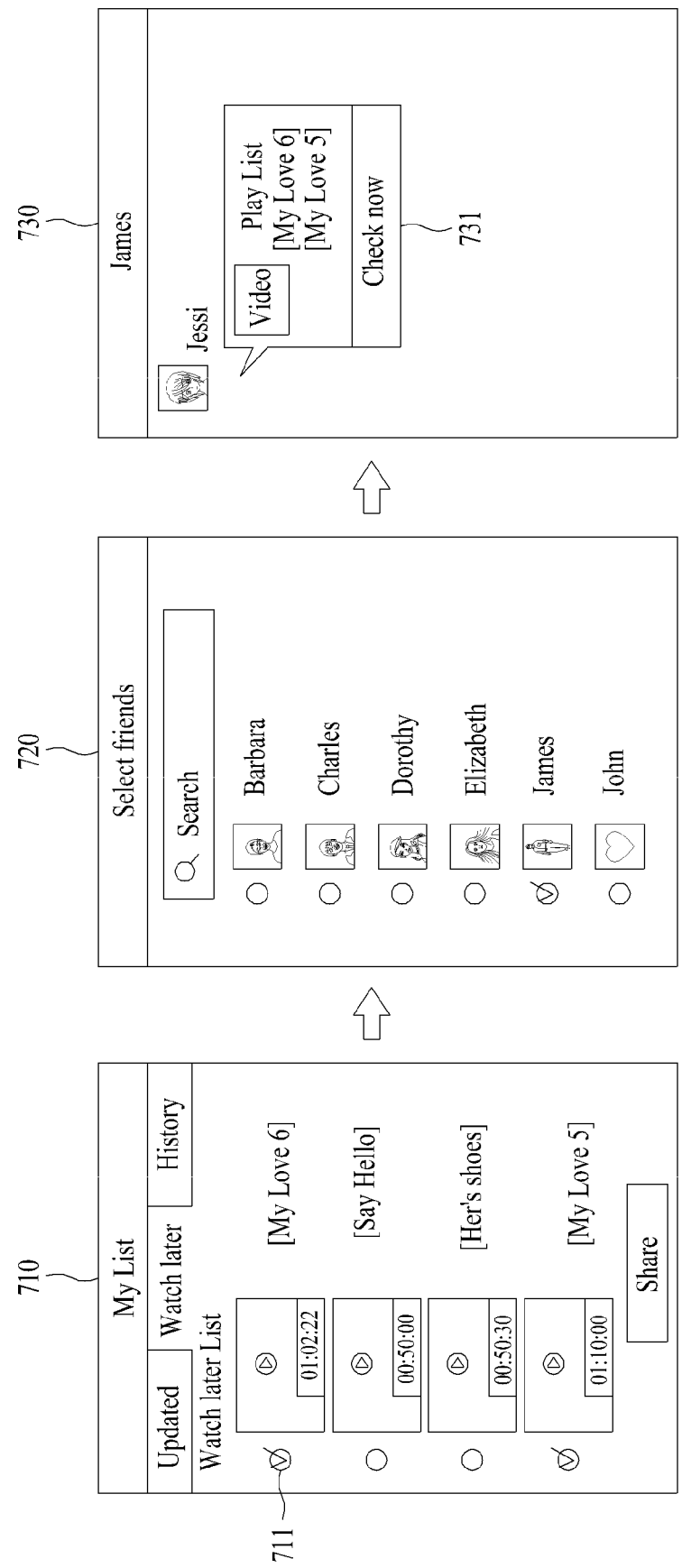

FIG. 7 is a diagram illustrating a function for sharing contents by a unit of list, according to at least one example embodiment of the inventive concepts.

Referring to FIG. 7, a video list screen 710 including a video list may include a selection menu 711 for selecting at least one or more videos to be shared with a friend. In the case where a user intents to share a video with a friend by the contents list, pieces of contents may be selected using the selection menu 711 of the video list screen 710, thereby making it possible to construct a contents sharing list. If the contents sharing list is constructed, the video list screen 710 may be switched into a messenger friend list screen 720 for selecting at least one messenger friend. For example, if a user selects a specific friend of the messenger friend list screen 720, the contents sharing list may be sent to a corresponding friend through a messenger. A sharing message 731 on a contents list of videos which a user intents to share may be displayed on a messenger conversation screen 730 between a user and a friend. For example, the sharing message 731 may include a link allowing a user to simultaneously access all videos included in a contents sharing list or to access videos independently.

The sharing function is described as selecting a friend after selection of content. In contrast, it may be possible to select contents after selection of a friend.

Below, a function for providing concurrent-users information on a video will be described.

Figure 8:
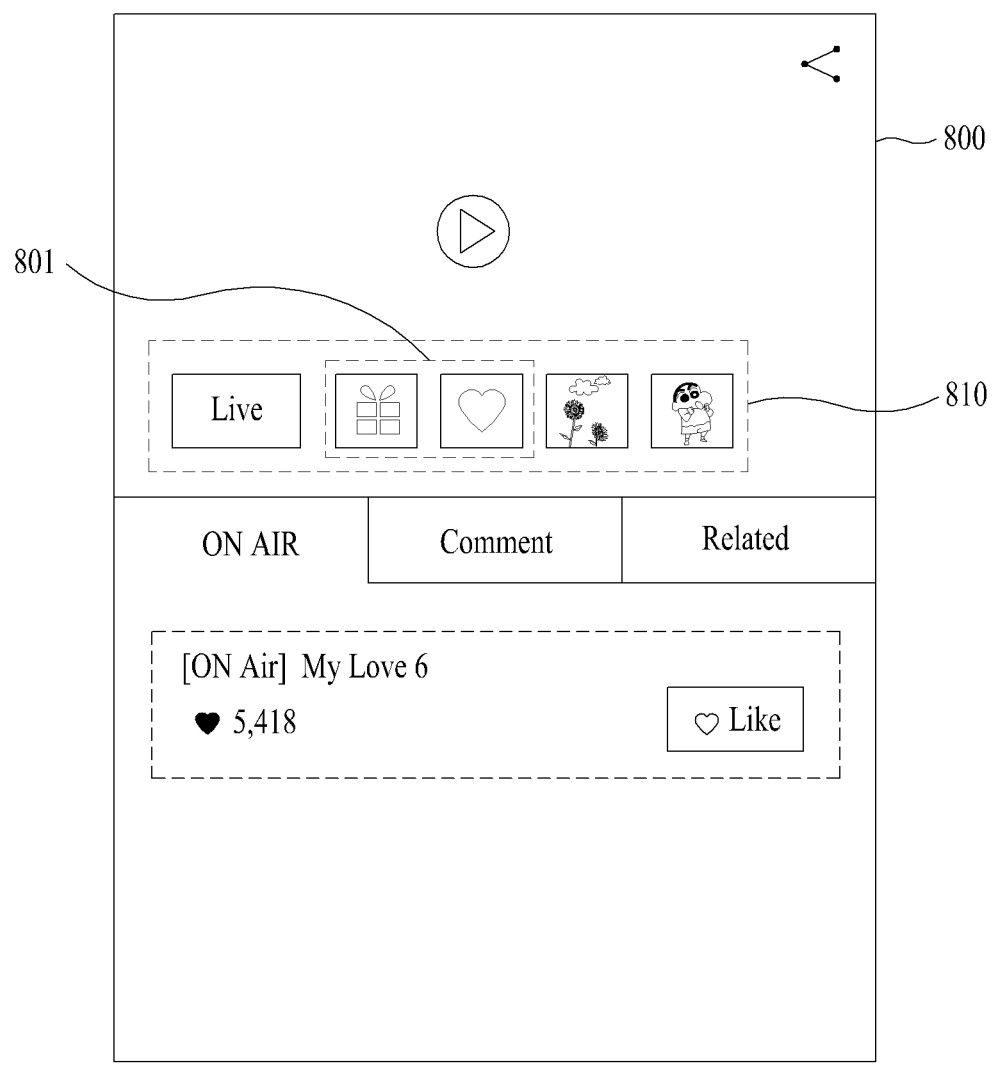

FIG. 8 is a diagram illustrating a live broadcast screen 800 on a live broadcast program according to at least one example embodiment of the inventive concepts.

Referring to FIG. 8, concurrent-users information 810 on concurrent users connecting to a live broadcast program at the same time slot may be provided on a live broadcast screen 800. For example, the concurrent-users information 810 may include profile information (e.g., nickname, photo, and the like) of service users watching a corresponding video. In at least one example embodiment of the inventive concepts, in particular, in the case where a messenger friend of a user is included in users connecting to live broadcast, a display manner may be changed so as to be distinguishable from other users, for example, a messenger friend 801 may be displayed at a top end portion of the list, or a profile of the messenger 801 may be highlighted.

According to at least one example embodiment of the inventive concepts, it may be possible to construct a platform for distribution and consumption of video contents using a messenger platform, and a service for recommending contents may be provided by analyzing mutual relationship between a user and the others with a social network-based service model.

Furthermore, according to at least one example embodiment of the inventive concepts, various business models are constructed with regard to a pay video purchasing model (e.g., by the contents providing system 100/200). For example, a variety of benefit information associated with contents in purchasing video contents is provided (e.g., by the contents providing system 100/200). For example, the function associated with the benefit information may be provided (e.g., by the contents providing system 100/200) with a saving-type coupon (e.g., stamp, millage, and the like) as well as a one-time coupon.

According to at least one example embodiment, information defining the screens shown in FIGS. 4-8 may be prepared by the contents providing system 100/200 and transmitted to the user terminal 101. The user terminal may display one, some or all of the screens illustrated in FIGS. 4-8 based on the information received at the user terminal 101 from the contents providing system 100/200.

Figure 9:
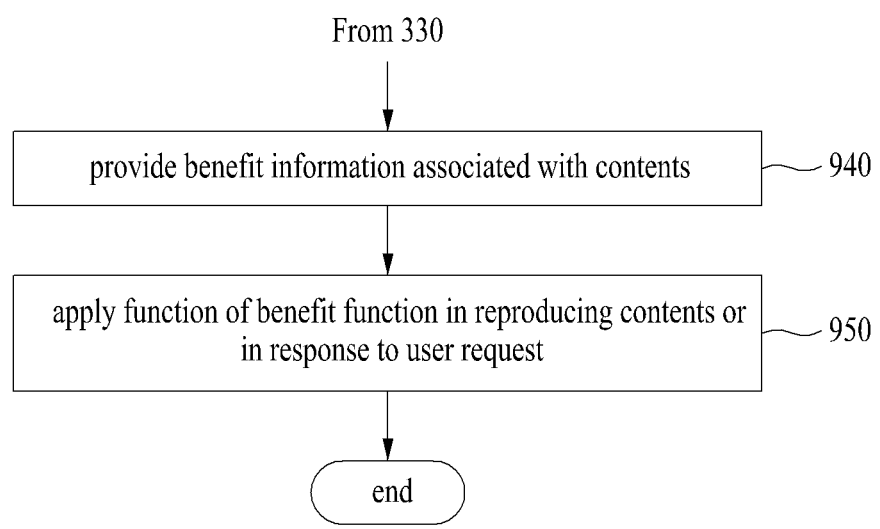
FIG. 9 is a flow chart illustrating a method for providing contents including benefit information, according to at least one example embodiment of the inventive concepts.

FIG. 9 is a flow chart illustrating a method for providing contents including benefit, according to at least one example embodiment of the inventive concepts. A method for providing contents including benefit information may be performed following a contents providing method described with reference to FIG. 3. Steps of FIG. 9 may be performed by a provision unit 213 being a component of a contents providing system 200 described with reference to FIG. 2.

Figure 10:
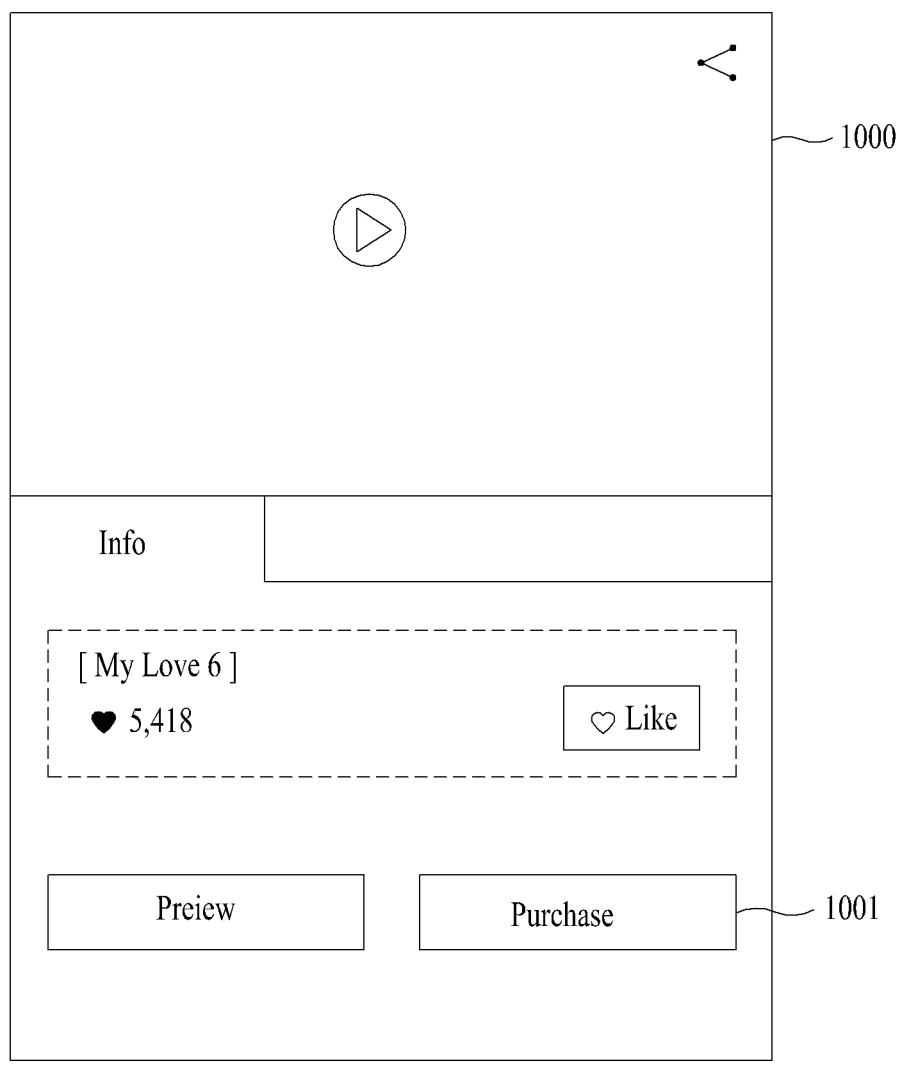
FIGS. 10 and 11 are diagrams illustrating a contents purchasing process and a benefit consuming process, according to at least one example embodiment of the inventive concepts.

In step 940, the provision unit 213 may provide benefit information associated with corresponding contents when a user purchases content. In other words, when content provided to a user is a pay video, the provision unit 213 may perform a purchasing process on corresponding contents based on purchasing intention of a user. If purchasing of the contents is completed through the purchasing process, the provision unit 213 may provide benefit information on the content. For example, referring to FIG. 10, in case of a pay video, a video details screen 1000 which provides information associated with a video may include a menu 1001 enabling a user to transmit contents purchasing intention, thereby making it possible to switch into a purchasing page for purchasing corresponding content.

In step 950, in the case of reproducing user-purchased contents or when a user request exists, the provision unit 213 may apply a function of benefit information provided together with content.

For example, the provision unit 213 may provide the benefit (hereinafter referred to as "preview") which allows a user to preview contents within a predetermined or, alternatively, desired time by hastening a contents loading speed. For example, the provision unit 213 may provide a preview function in which a specific user previously watches a video, which general purchasers watch within three hours, within one hour.

As another example, the provision unit 213 may provide the benefit (hereinafter referred to as "long view") which allows the available period appointed to contents is extended by a constant period. For example, the available period of seven days appointed to a video may be extended three days with respect to a specific user, thereby making it possible for the specific user to watch the video during ten days.

Figure 11:
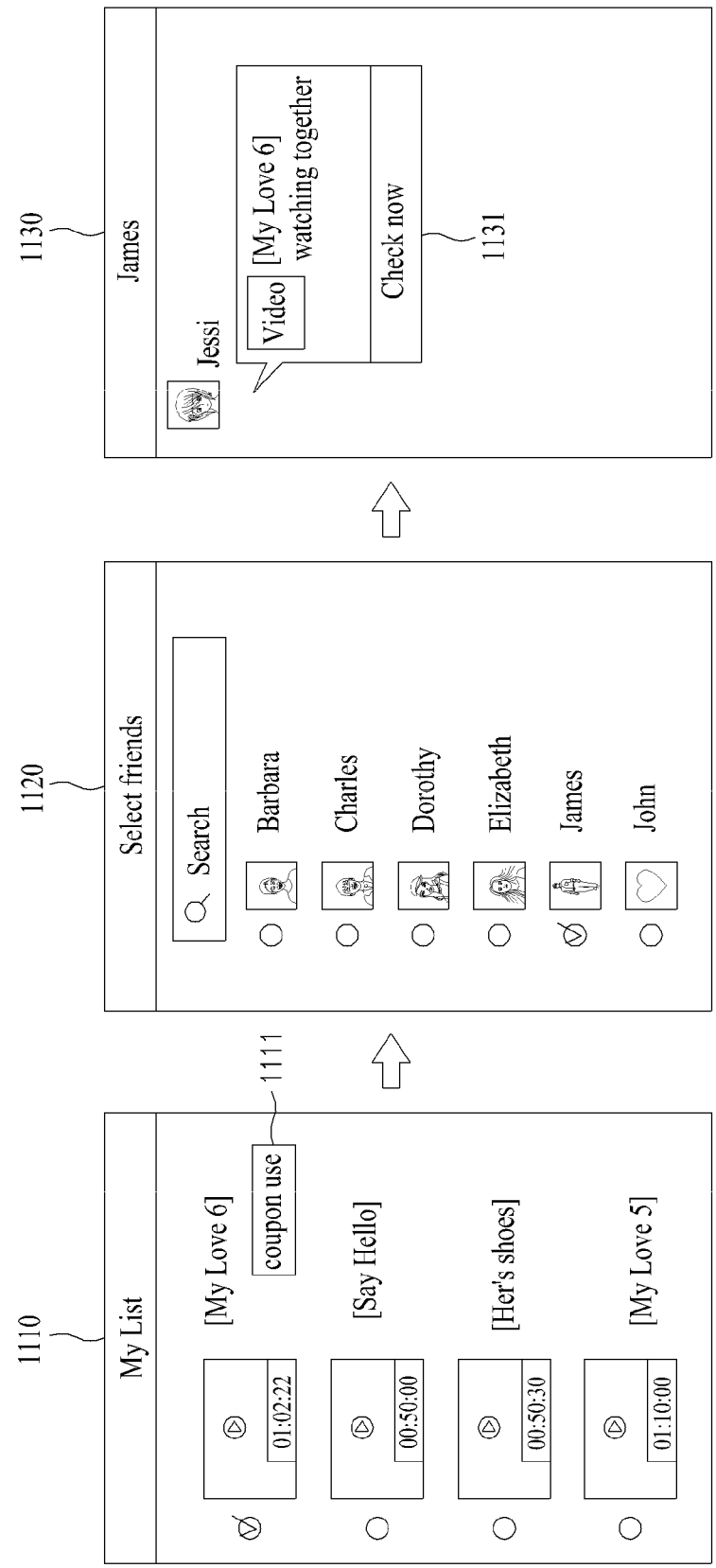

As still another example, the provision unit 213 may provide the benefit (hereinafter referred to as "together view") which allows a user to watch purchased contents together with at least one friend on a messenger. In other words, if a user purchases a pay video using a social network, the provision unit 213 may provide a "together view" function in which some friends (e.g., three friends) are allowed to watch the pay video. For example, referring to FIG. 11, a video list screen 1110 in which a video list is included may include a selection menu 1111 for selecting a "together view" coupon on each video. If a user selects the "together view" coupon using the selection menu 1111 of the video list screen 1110, the video list screen 1110 may be switched into a messenger friend list screen 1120 for selecting at least one messenger friend. For example, if a user selects a specific friend of the messenger friend list screen 1120, a video to which a "together view" coupon is applied may be transmitted to the selected friend through a messenger. A sharing message 1131 on a user-purchased video may be displayed on a messenger conversation screen 1130 between a user and a friend and may include a link through which a friend accesses a corresponding video.

As other example, the provision unit 213 may provide benefit information, which is provided to a user in purchasing content, to at least one friend selected by a user. In other words, the provision unit 213 may provide a gift function in which a user gifts a coupon provided through purchasing of contents to a friend through a messenger as it is.

As still other example, the provision unit 213 may provide advertisement information to a user, which purchases contents in connection with advertisement, together with benefit information. Here, the advertisement information may include randomly extracted advertisement or advertisement associated with contents which a user purchases. The advertisement information may be provided in such a way that advertisement is once displayed just after purchasing of contents or in consuming benefit information or in such a way that advertisement is displayed every access to a video or benefit information. Alternatively, the provision unit 213 may use an advertisement image corresponding to advertisement information as an image associated with benefit information to provide a predetermined or, alternatively, desired advertisement to a user purchasing content.

Furthermore, in the case where a user consumes advertisement in connection with advertisement, the provision unit 213 may provide benefit information on content. For example, the provision unit 213 may display advertisement information to a user during contents purchasing or after purchasing of contents is completed. Accordingly, if a switching operation (e.g., watching advertisement over five seconds, click advertisement, moving to an advertisement page, and the like) leading to actual advertising effectiveness by a user is performed, the provision unit 213 may provide the following benefits with respect to user-purchased content: preview, long view, together view, gifting, and the like. For example, advertisement information may include randomly extracted advertisement or advertisement associated with contents which a user purchases.

According to at least one example embodiment of the inventive concepts, it a variety of information may be provided (e.g., by the contents providing system 100/200), such as preview, long view, together view, gifting, and the like, with respect to a purchasing model of video contents. Also, it may be possible to implement various business models for providing advertisement together with a benefit or a benefit to a user watching advertisement in connection with advertisement.

Furthermore, according to at least some example embodiments, a new traffic model may be constructed (e.g., by the contents providing system 100/200) in connection with associated contents at a contents distribution environment, which is based on a social network, with respect to each piece of video contents. In particular, it may be possible to display additional contents associated with corresponding video contents on a contents page, in which information on video contents is included, with respect to each piece of video contents. For example, at least one of a sticker, an official account, or product advertisement may be included as additional contents associated with video contents.

Figure 12:
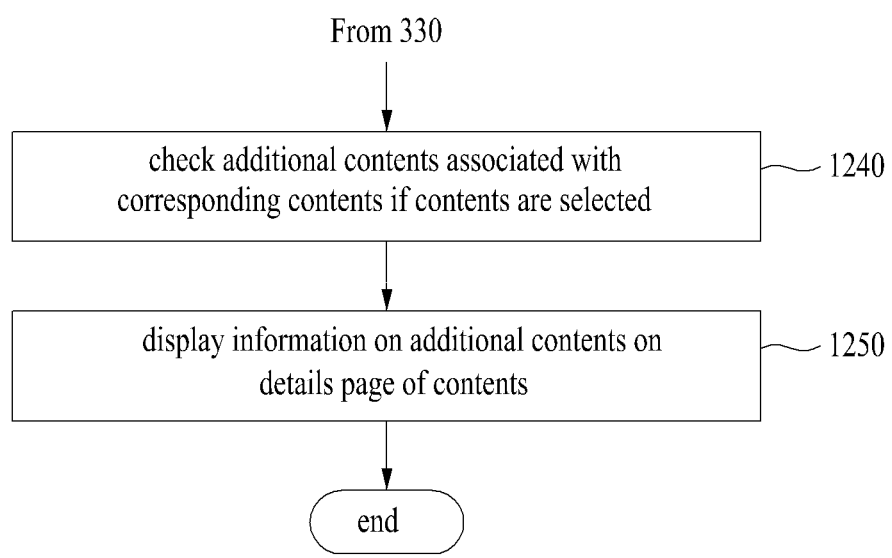
FIG. 12 is a flow chart illustrating a method for providing additional contents associated with video contents, according to at least one example embodiment of the inventive concepts.

FIG. 12 is a flow chart illustrating a method for providing additional contents associated with video contents, according to at least one example embodiment of the inventive concepts. A contents providing method may be performed following a contents providing method described with reference to FIG. 3. Steps of FIG. 12 may be performed by a provision unit 213 being a component of a contents providing system 200 described with reference to FIG. 2.

In step 1240, if specific video contents are selected by a user, the provision unit 213 may check additional contents associated with corresponding video contents from database 250. For example, the provision unit 213 may check at least one of a sticker, an official account, or product advertisement associated with video contents, as additional contents associated with video contents.

In step 1250, the provision unit 213 may display additional contents associated with corresponding video contents on a contents page in which information on video contents is included. For example, the provision unit 214 may display distributable additional contents in connection with corresponding contents through a detail page being a screen on which video contents is reproduced or detail information (e.g., story, character, and the like) associated with video contents is displayed.

For example, the provision unit 213 may display information on a sticker associated with video contents on a detail page of video contents. For example, the provision unit 213 may provide a sticker to a details page of video contents in connection with a download page having a function for downloading the sticker. As another example, the provision unit 213 may display information on an official account of video contents on a detail page of video contents. For example, the provision unit 213 may provide, to a details page of the video contents, a friend addition page having a function for adding the official account to a messenger friend list of a user together. As still another example, the provision unit 213 may display advertisement information on a product associated with video contents on a details page of the video contents. Likewise, the provision unit 213 may provide the advertisement information to the details page of the video contents in connection with a product purchasing page having a function for purchasing a product associated with the video contents. Accordingly, the provision unit 213 may attract traffic on additional contents to a detail page in connection with additional contents on at least one of a sticker, an official account, or product advertisement associated with video contents, with respect to each piece of video contents.

For example, in the case where additional contents are charged or delivery of an actual product is needed, the provision unit 213 may support a purchasing process including payment, delivery, and the like. For example, it may be possible to apply a purchasing process included in a messenger to additional content. Alternatively, the provision unit 213 may use an e-commerce (EC)-based family application (or app) associated with a messenger as a purchasing process on additional content. As other example, the provision unit 213 may provide an out link to a corresponding shopping mall to allow a purchasing process to be directly performed at the shopping mall. In other words, the provision unit 213 may apply a purchasing process of a messenger for a display and link selling of additional contents with respect to each video, may connect product code or video code through a family application, or may provide a shopping mall out link.

When displaying additional contents on a details page of video contents, the provision unit 213 may together display a friend list having an interaction history with respect to corresponding additional content, based on service use histories of messenger friends. For example, in the case where a specific sticker is displayed at a details page of video contents, the provision unit 213 may together display a list of friends downloading a corresponding sticker to allow a user to see the friend list.

Furthermore, the provision unit 213 may recommend additional contents to be displayed through a details page of video contents to a user, based on service use histories of friends or the level of closeness on a relationship with a friend. In the case of a sticker or product advertisement, since pieces of additional contents associated with the same video exist, the provision unit 213 may display at least one, having an interaction history by a messenger friend of a user, from among pieces of additional contents associated with video contents. For example, the provision unit 213 may select and provide popular contents obtaining the high reaction level from messenger friends during a recent constant period, for example, a sticker which friends largely download or a product which friends largely purchase or like, as recommended content. Furthermore, the provision unit 213 may select and provide additional contents having an interaction history from a friend, selected according to the level of closeness, from among friends of a user. For example, the provision unit 213 may extract the predetermined or, alternatively, desired number of friends in a descending order of closeness and may provide, as recommended content, additional contents having download or purchasing histories of corresponding friends. Also, when displaying pieces of additional contents associated with video contents as a list, the provision unit 213 may apply the level of closeness to a display reference of the additional contents list. In other words, the provision unit 213 may display contents of a contents list having an interaction history by a closer friend at a top end portion of the list.

Figure 13:
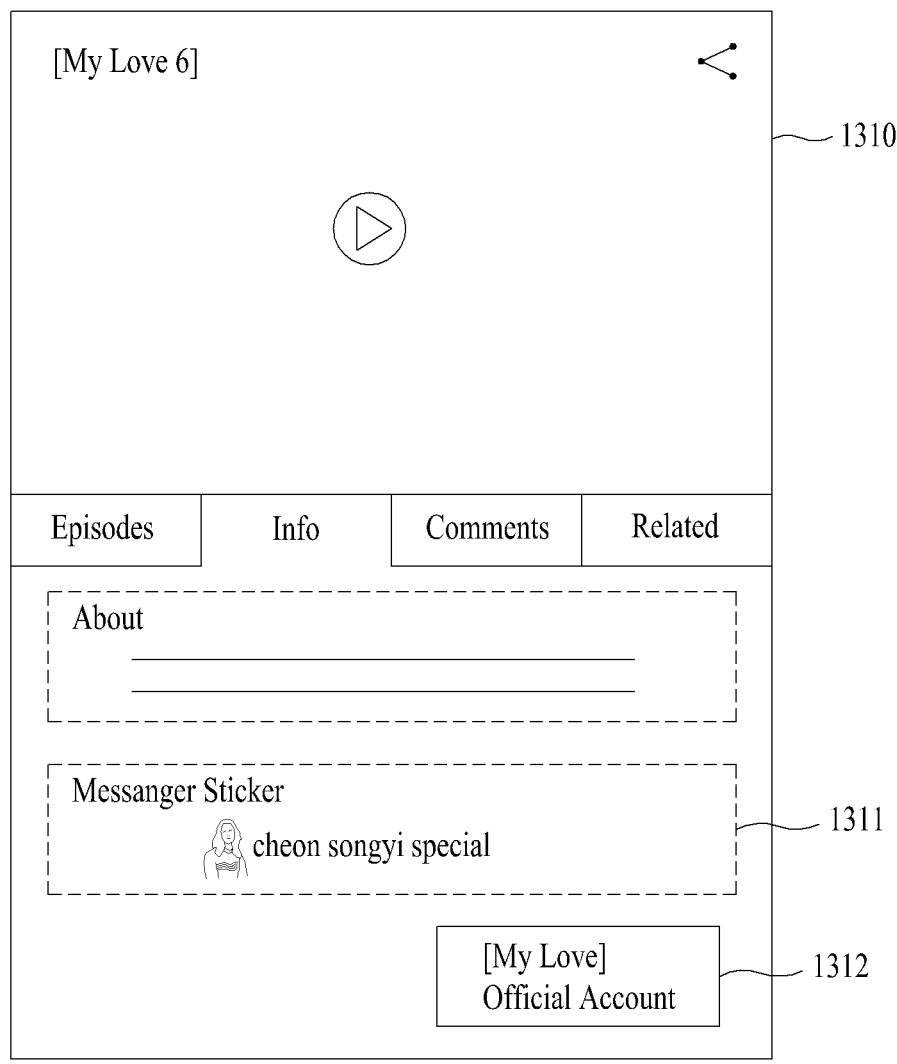
FIGS. 13 to 15 are diagrams illustrating a process for displaying additional content, according to at least one example embodiment of the inventive concepts.

For example, referring to FIG. 13, detail information associated with a video and information on a sticker and an official account usable on a messenger as additional contents associated with a corresponding video may be provided on a video detail screen 1310. For example, the video detail screen 1310 may include a sticker download menu 1311 for downloading a sticker and a friend addition menu 1312 for adding an official account as a messenger friend. For example, if a user selects the sticker download menu 1311 of the video detail screen 1310, a sticker download screen 1420 may be provided as illustrated in FIG. 14A, and it may be possible to download or purchase a sticker through the sticker download screen 1420. Also, if the user selects the friend addition menu 1312 of the video detail screen 1310, a friend addition screen 1430 may be provided as illustrated in FIG. 14B, thereby making it possible to add a friend on an official account through the friend addition screen 1430.

Figure 15:
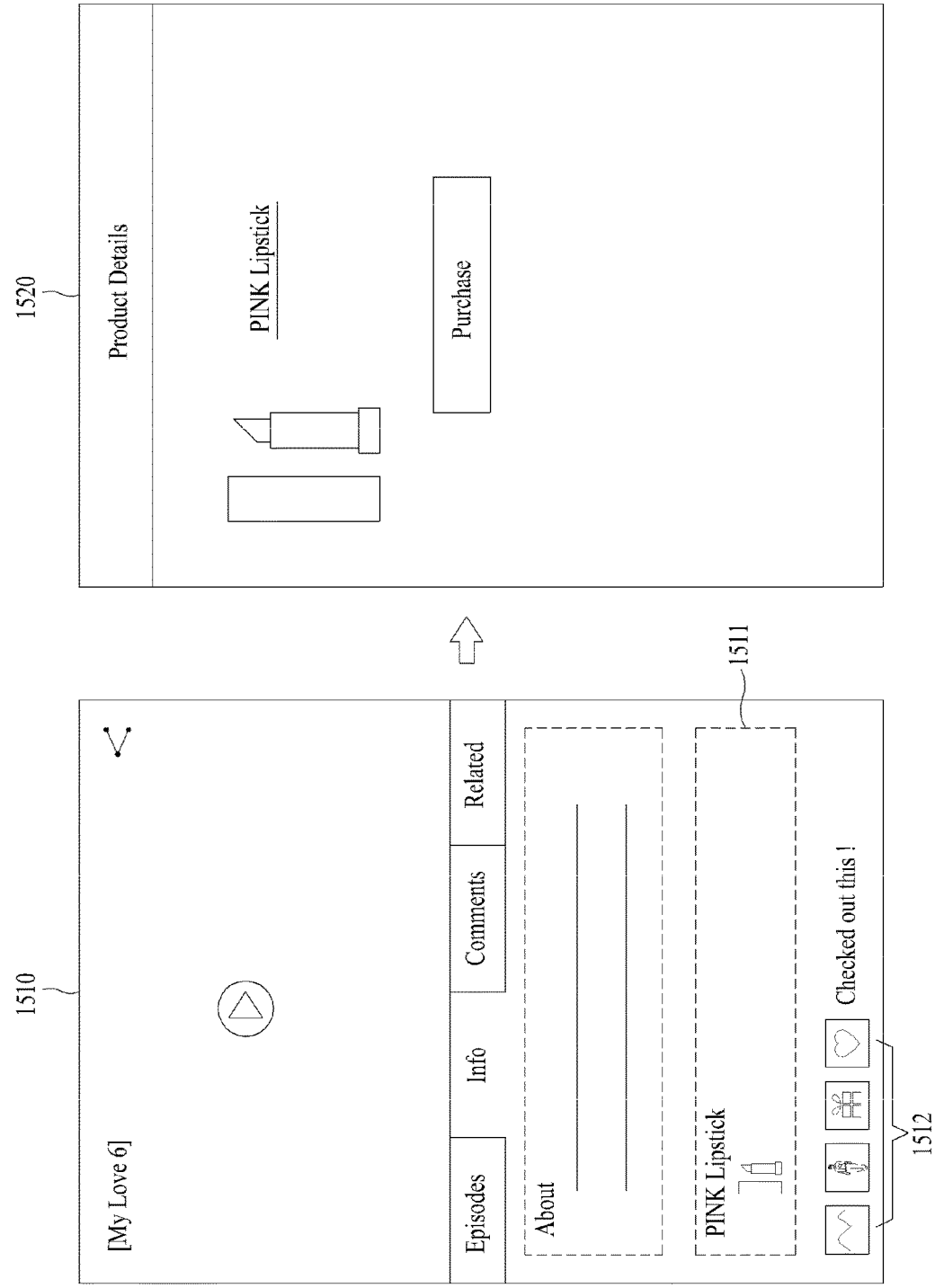

As another example, referring to FIG. 15, detail information associated with a video and advertisement information on a product in the video may be provided on the video detail screen 1510. For example, the video detail screen 1510 may include a page move menu 1511 for moving to a detail page of product advertisement. Also, a list 1512 of messenger friends purchasing and liking a corresponding product may be displayed on the video detail screen 1510. If a user selects a page move menu 1511 of a video detail screen 1510, the video detail screen 1510 may be switched into a product purchasing screen 1520 including detail information of a product and a menu including a function for purchasing a corresponding product. For example, it may be possible to purchase a product through the product detail screen 1520.

Accordingly, it may be possible to attract traffic on various models to video contents in connection with additional contents at a contents distribution environment based on a social network.

In addition, in at least one example embodiment of the inventive concepts, it may be possible to provide a multi-track function on video contents on a messenger platform. In particular, it may be construct a new service model in which a characteristic of a messenger platform is applied to a multi-track function.

Figure 14:
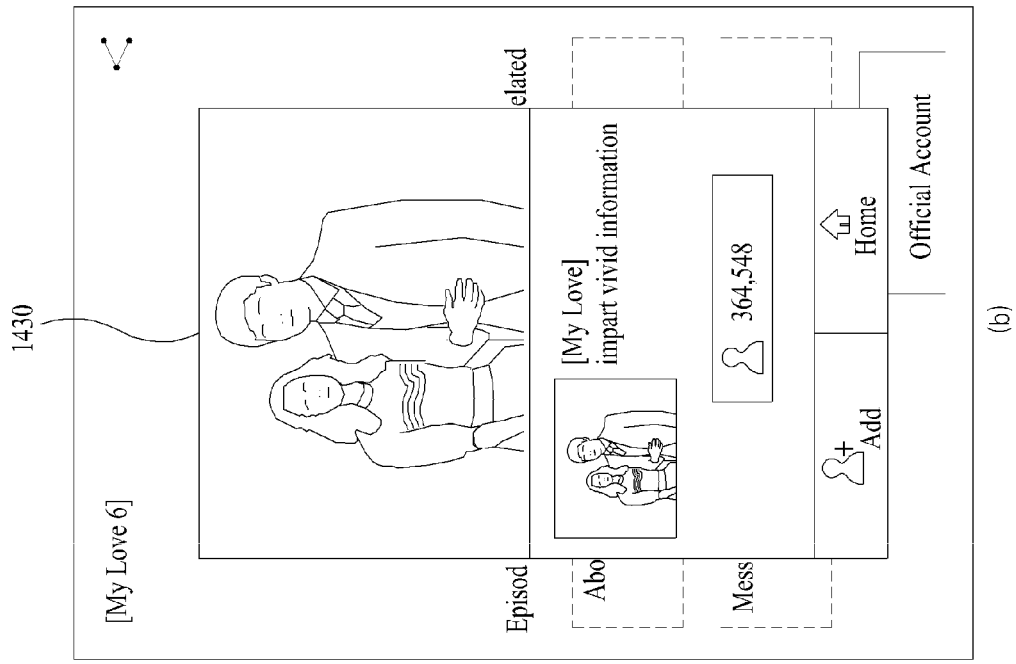
Figure 14:
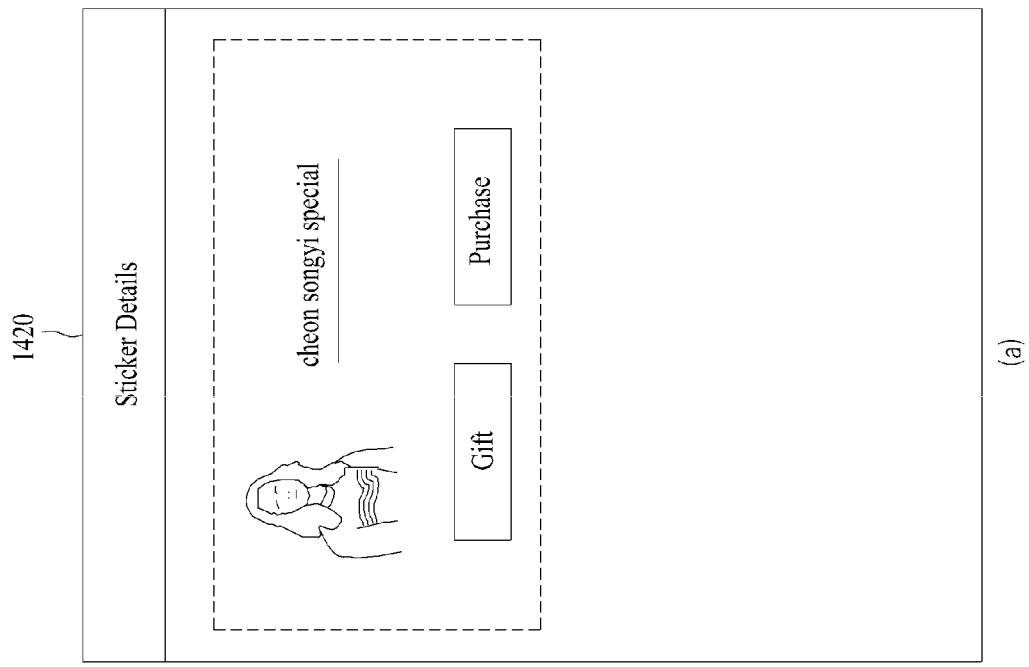

According to at least one example embodiment, information defining the screens shown in FIGS. 13-15 may be prepared by the contents providing system 100/200 and transmitted to the user terminal 101. The user terminal may display one, some or all of the screens illustrated in FIGS. 13-15 based on the information received at the user 101 terminal from the contents providing system 100/200.

Figure 16:
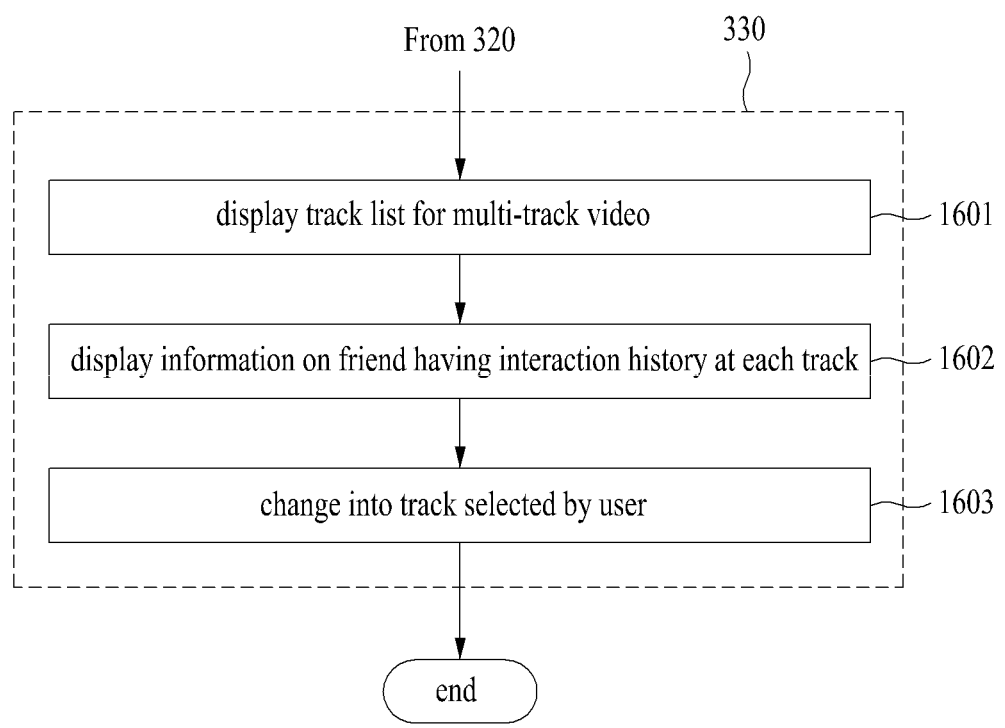
FIG. 16 is a flow chart illustrating a method for providing a multi-track video, according to at least one example embodiment of the inventive concepts.

FIG. 16 is a flow chart illustrating a method for providing a multi-track video, according to at least one example embodiment of the inventive concepts. A multi-track video providing method may correspond to step 330 of a contents providing method described with reference to FIG. 3. Steps of FIG. 16 may be performed by a provision unit 213 being a component of a contents providing system 200 described with reference to FIG. 2.

In step 1601, the provision unit 213 may display a track list of a video when video contents provided to a user is a multi-track video formed of N image tracks. For example, the provision unit 213 may display a list of all tracks always while a video is being reproduced. As another example, if a user requests a list using a separate menu provided on a video reproduction screen, the provision unit 213 may display a track list of the video. As still another example, the provision unit 213 may display choices on at least two or more tracks of a video track list at a point in time when a track change previously set to a video during reproducing a video is necessary.

In step 1602, the provision unit 213 may display a list of friends having an interaction history on each track with respect to a track list of a multi-track video. For example, the provision unit 213 may display a friend profile photo registered at a messenger as information of a friend selecting a corresponding track, thereby making it possible for a user to check a track of a video track list which messenger friends select.

In step 1603, the provision unit 213 may change a reproduction track of a multi-track video into a track of a track list selected by a user, thereby making it possible for a user to check a changeable track of a track list and to receive a video while freely selecting and changing a track. For example, the provision unit 213 may provide a service for simultaneously reproducing a video of a track selected by a user and a video of a track selected by at least one friend.

Below, a method for displaying a track list included in a multi-track video will be described.

The provision unit 213 may use a social network on a messenger or the level of closeness between a user and a friend as a reference for displaying a track list of a multi-track video.

For example, the provision unit 213 may display all tracks of a multi-track video in an order of track which has high interaction history by friends. For example, the interaction history may mean that a track of a track list is selected, that is, that a track of a video is changed according to selection of a track in a list. In other words, the provision unit 213 may show a track list of a multi-track video in an order of track which friends largely select.

At another example, the provision unit 213 may display a track list of a multi-track video in track order of interaction history by a friend with the high level of closeness with a user. For example, the provision unit 213 may display a track selected by a best friend of a user at the top of a list and a track selected by a friend with the lowest level of closeness at the bottom of the list.

As still another example, the provision unit 213 may recommend a track, having an interaction history by at least one friend selected according to the level of closeness with a user, from among tracks in a track list of a multi-track video. For example, the provision unit 213 may recommend a track, which two close friends of a user select, from among tracks in a track list of a multi-track video. Furthermore, the provision unit 213 may automatically recommend and reproduce a video of a track, selected by the best friend of a user, as an initial reproduction track in reproducing a multi-track video.

FIGS. 17 to 22 are diagrams illustrating multi-track video service screens according to at least one example embodiment of the inventive concepts.

Figure 17:
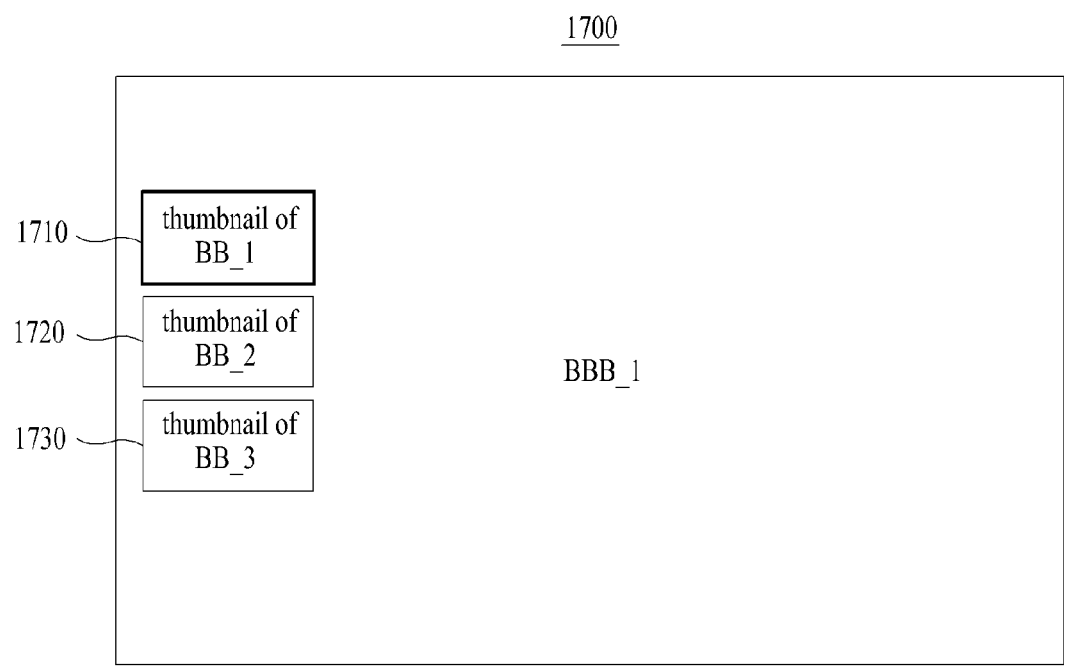
FIGS. 17 to 22 are diagrams illustrating a multi-track function of a video according to at least one example embodiment of the inventive concepts.

A first screen 1700 of FIG. 17 may illustrate an example screen where a video "BBB_1" is reproduced. For example, thumbnails 1710 to 1730 of videos "BBB_1", "BBB_2", "BBB_3" included in a multi-track video may be displayed at the left of the first screen 1700 as a track list. A second screen 1800 of FIG. 18 may illustrate an example screen where as a user selects the thumbnail 1720 of the video "BBB_2" in the first screen 1700 of FIG. 17, a track is changed and the video "BBB_2" is reproduced. A third screen 1900 of FIG. 19 may illustrate an example screen where as a user selects the thumbnail 1730 of the video "BBB_3" in the second screen 1800 of FIG. 18, a track is changed and the video "BBB_3" is reproduced.

For example, a corresponding multi-track video may be a music video of a band "BBB" formed of three members. For example, the video "BBB_1" may be a video on a first member of the band "BBB", the video "BBB_2" may be a video on a second member of the band "BBB", and the video "BBB_3" may be a video on a third member of the band "BBB". In this case, a user may be selectively provided with various images while playing music (audio) of the music video.

Figure 18:
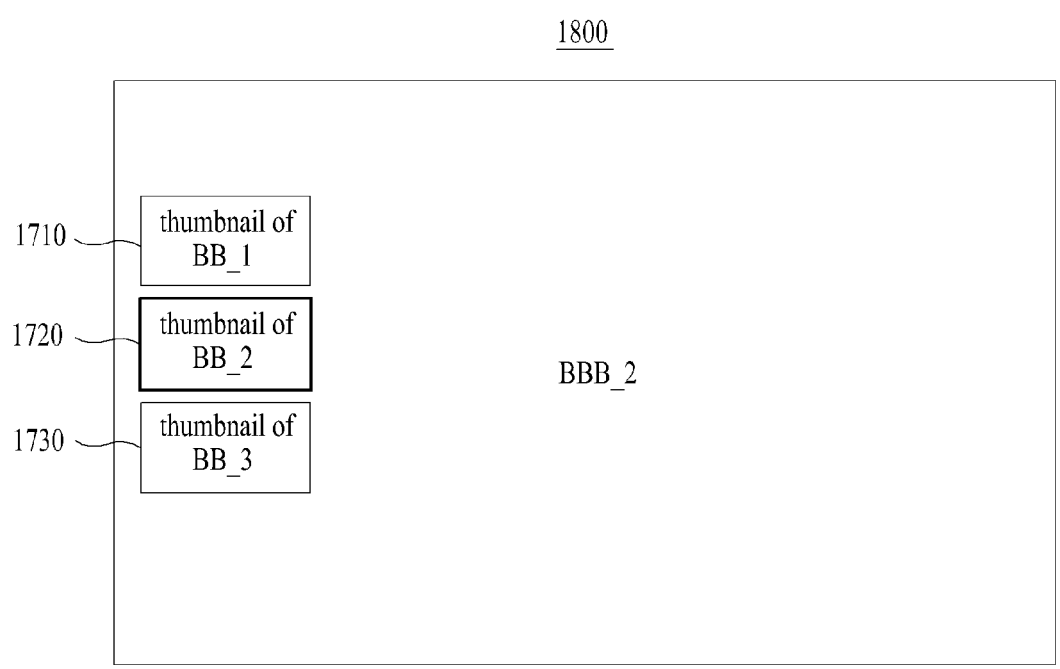
Figure 19:
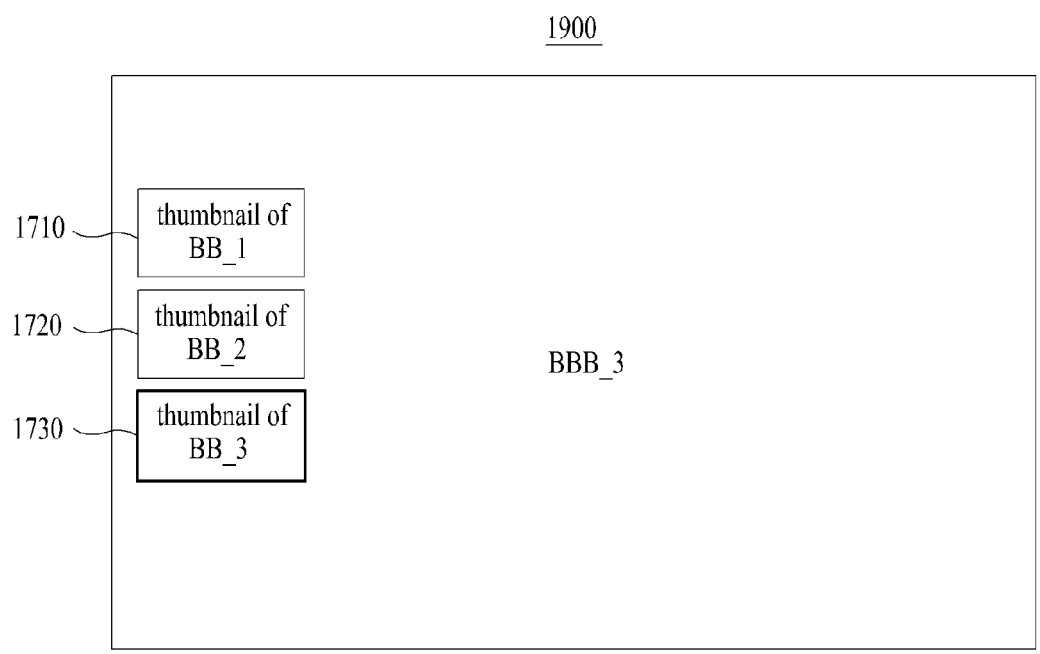

Embodiments of FIGS. 17 to 19 illustrate example operations for providing a user interface for changing a track using a thumbnail. A user interface for a track change may be variously modified or constructed. It may be obvious that a manner for providing information on plural videos to a user is variously implemented.

In particular, the provision unit 213 may display a list of friends having an interaction history on each track of a track list of a multi-track video.

Figure 20:
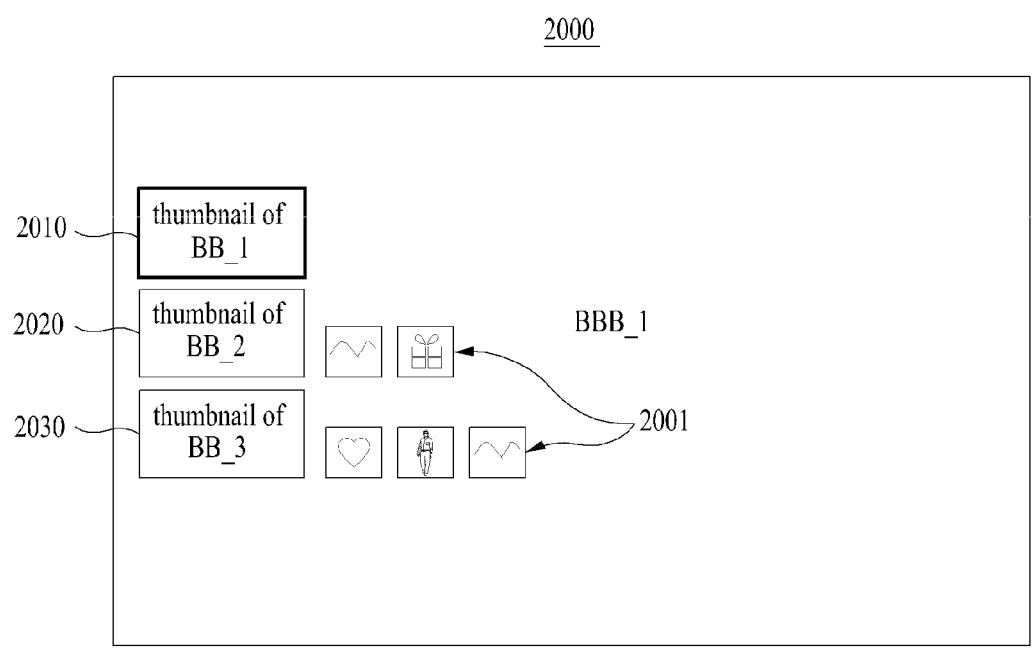

A service screen 2000 of FIG. 20 may illustrate a list of tracks included in a multi-track video. Thumbnails 2010 to 2030 of videos "BBB_1", "BBB_2", and "BBB_3" included in a multi-track video may be illustrated in FIG. 20. In this case, information 2001 on friends having a selection history on a corresponding track may be displayed at one side of each of thumbnails 2010 to 2030 respectively indicating tracks, in the service screen 2000. In other words, a user may check a track(s) selected by friends, based on a messenger profile photo of a corresponding friend placed at one side a thumbnail of a track selected by a messenger friend.

Figure 21:
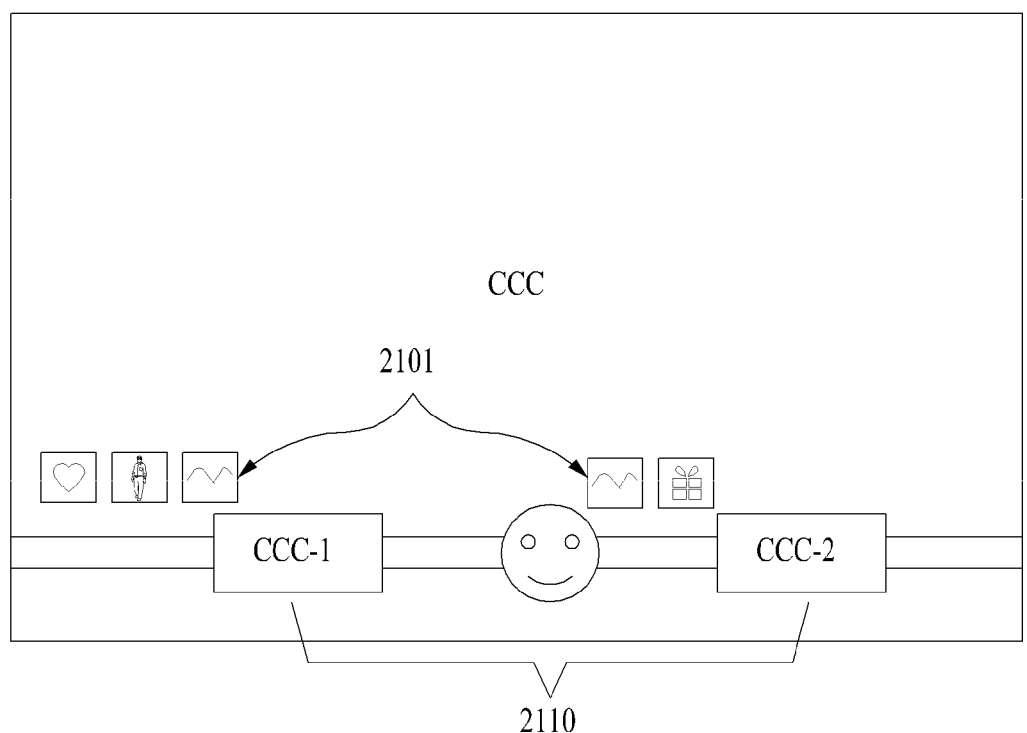

As another example of a multi-track function, a service screen 2100 of FIG. 21 may illustrate an example screen where an interactive-type video "CCC" is reproduced. Displayed at a bottom end portion of the service screen 2100 are choices 2110 for selecting one of videos "CCC_1" and "CCC_2" included in a multi-track video.

For example, a multi-track video may be a music video "CCC" formed of tracks having various backgrounds. Here, a video "CCC_1" may be a video where the sea is used as a background, and a video "CCC_2" may be a video where a mountain is used as a background. In this case, the provision unit 213 may display choices 2110 on the videos "CCC_1" and "CCC_2" included in a multi-track video at a point in time when a track change is possible during reproducing of the music video "CCC", thereby making it possible for a user to be provided with the video "CCC_1" or the video "CCC_2" through the choices 2110 while reproducing music (audio) of the music video "CCC".

Likewise, when displaying choices on a track list of a multi-track video, the provision unit 213 may display a list of friends having an interaction history on each track. As illustrated in FIG. 21, information 2101 of a friend having a selection history on a corresponding track may be together displayed at one side of each of items indicating tracks corresponding to the choices 2110.

As other example of the multi-track function, the provision unit 213 may simultaneously provide a video of a track selected by a user and a video of a track selected by at least one friend when providing a video of a track, selected by a user, from among tracks in a track list of a multi-track video.

Figure 22:
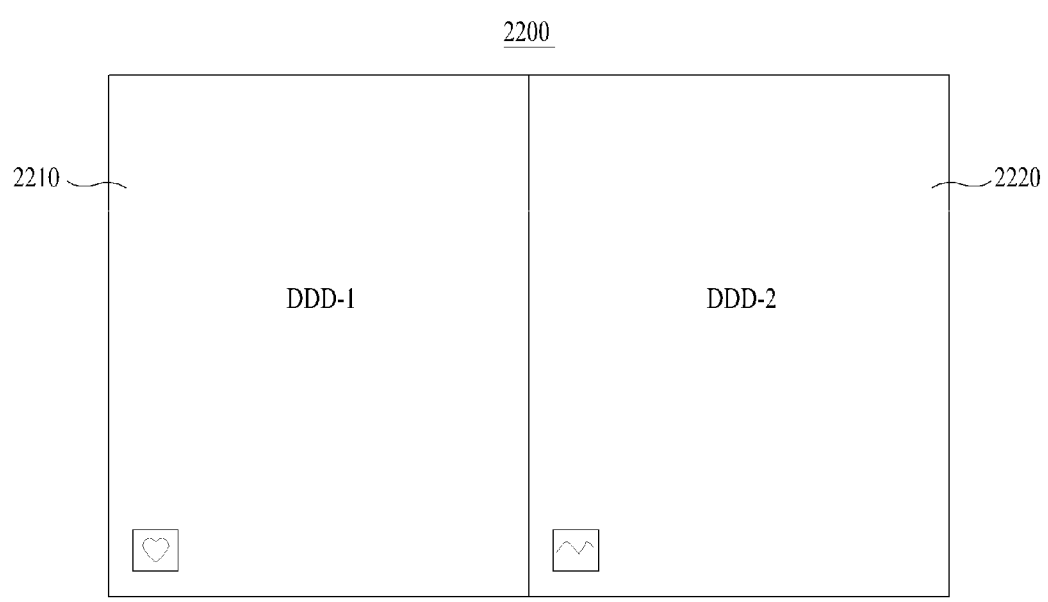

A service screen 2200 of FIG. 22 may be a screen where a video 2210 of a track selected by a user and a video 2220 of another track selected by a friend are simultaneously reproduced. For example, a multi-track video may be contents formed tracks of which the storylines are various. Here, a video "DDD_1" may have a storyline selected by a user, and a video "DDD_2" may have a storyline selected by a friend. Messenger profile photos of the user and the friend may be respectively displayed at bottom end portions of screens where storylines are reproduced.

The service screen 2200 of FIG. 22 may be provided if a user selects a specific track using thumbnails 2010 to 2030 of a track list in FIG. 20 and selects a specific friend using friend information 2001 displayed at one side of each of the thumbnails 2010 to 2030. Alternatively, it may be possible to provide a service for constructing the service screen 2200 of FIG. 22 using a video of a track, selected by a friend having the high level of closeness with a user or by a friend previously set by the user, and a video of a track, selected by the user, from among tracks of a track list.

A video service may be extended and diversified by combining a characteristic of a social platform with video contents formed of a multi-track video.

Furthermore, according to at least one example embodiment of the inventive concepts, it may be possible to construct a variety of service models in which a video service is combined with a characteristic of a messenger platform. In particular, it may be possible to provide a function of connecting a chatting and a video freely.

According to at least one example embodiment, information defining the screens shown in FIGS. 17-22 may be prepared by the contents providing system 100/200 and transmitted to the user terminal 101. The user terminal may display one, some or all of the screens illustrated in FIGS. 17-22 based on the information received at the user 101 terminal from the contents providing system 100/200.

Figure 23:
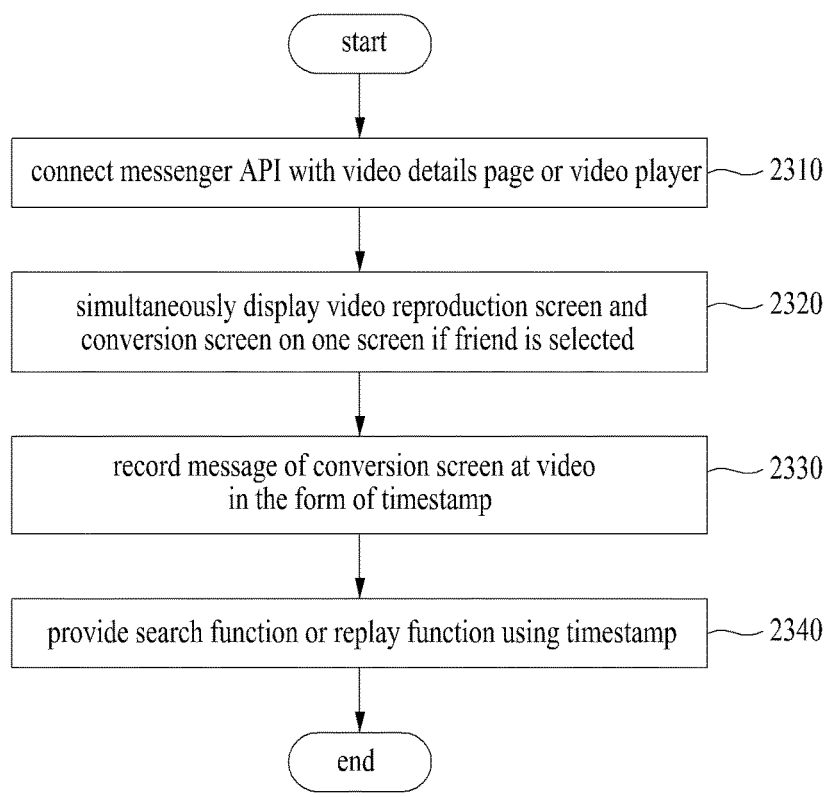
FIG. 23 is a flow chart illustrating a method for providing a video in connection with a chatting, according to at least one example embodiment of the inventive concepts.

FIG. 23 is a flow chart illustrating a method for providing a video in connection with a chatting, according to at least one example embodiment of the inventive concepts. Steps of a method for providing a video in connection with a chatting may be performed by a provision unit 213 being a component of a contents providing system 200 described with reference to FIG. 2.

In step 2310, the provision unit 213 may connect an application program interface (API) on a messenger with a page associated with a specific video selected by a user. For example, a video-associated page may correspond to a video details page, in which details information of a video is provided, a service screen of a player dedicated for video reproduction, or the like. In other words, the providing unit 213 may provide a menu environment for calling a chatting function of a messenger to the video detail page or video player screen. For example, the chatting function may support a one-to-many group chatting environment as well as a one-to-one chatting environment and may make it possible for a user to select at least one or more friends, with which the user wants to watch a video, through a menu provided at the video details page or video player screen.

If a specific friend is selected by the user, in step 2320, the provision unit 213 may connect a video player with the chatting function to simultaneously display a video reproduction screen, in which a specific video is reproduced, and a conversation screen for chatting with a specific friend. For example, the provision unit 213 may display the video reproduction screen and a conversation screen in the form of screen division such as picture in picture (PIP). The screen division manner may be a manner in which a screen is divided into top and bottom screens or left and right screens and the divided screens are displayed together. For example, the video reproduction screen may be displayed at an upper end portion, and the conversation screen may be displayed at a lower end portion. Alternatively, the video reproduction screen may be displayed at the left, and the conversation screen may be displayed at the right. As another example, the provision unit 213 may overlap the video reproduction screen and the conversation screen in the form of layer to display the video reproduction screen and the conversation screen at the same time. For example, the provision unit 213 may adjust transparency of the conversation screen so as not to hinder video watching and may then overlap and display the conversation screen on the video reproduction screen.

In step 2330, the provision unit 213 may record messages, which are exchanged between a user and a friend through the conversation screen when a video is being reproduced, in the form of timestamp. As the video reproduction screen and the conversation screen are simultaneously displayed as one screen, a user may chat with a fried while watching a video. For example, the provision unit 213 may perform coding by recording a conversation between a user and friend at a corresponding point of a video in the form of timestamp in synchronization with a video reproduction time.

In step 2340, the provision unit 213 may provide a search function for searching for a specific point of a video using a timestamp or a replay function for again watching the video together with a message. For example, the provision unit 213 may search for a specific message of messages exchanged between a user and a friend on the conversation screen. For example, it may be possible to search for an image section of a point in time when a corresponding message is input, from a video watched together with the friend through a timestamp of a specific message. Furthermore, if a specific section of a video is selected, the provision unit 213 may check a message exchanged in the selected section through a timestamp. As another example, in the case of replaying a video watched together with a friend, the provision unit 213 may display the video reproduction screen and the conversation screen at the same time. In this case, the provision unit 213 may again display messages, which are exchanged between a user and a friend while watching a video, by mapping the messages onto timestamps recorded at the video.

Figure 24:
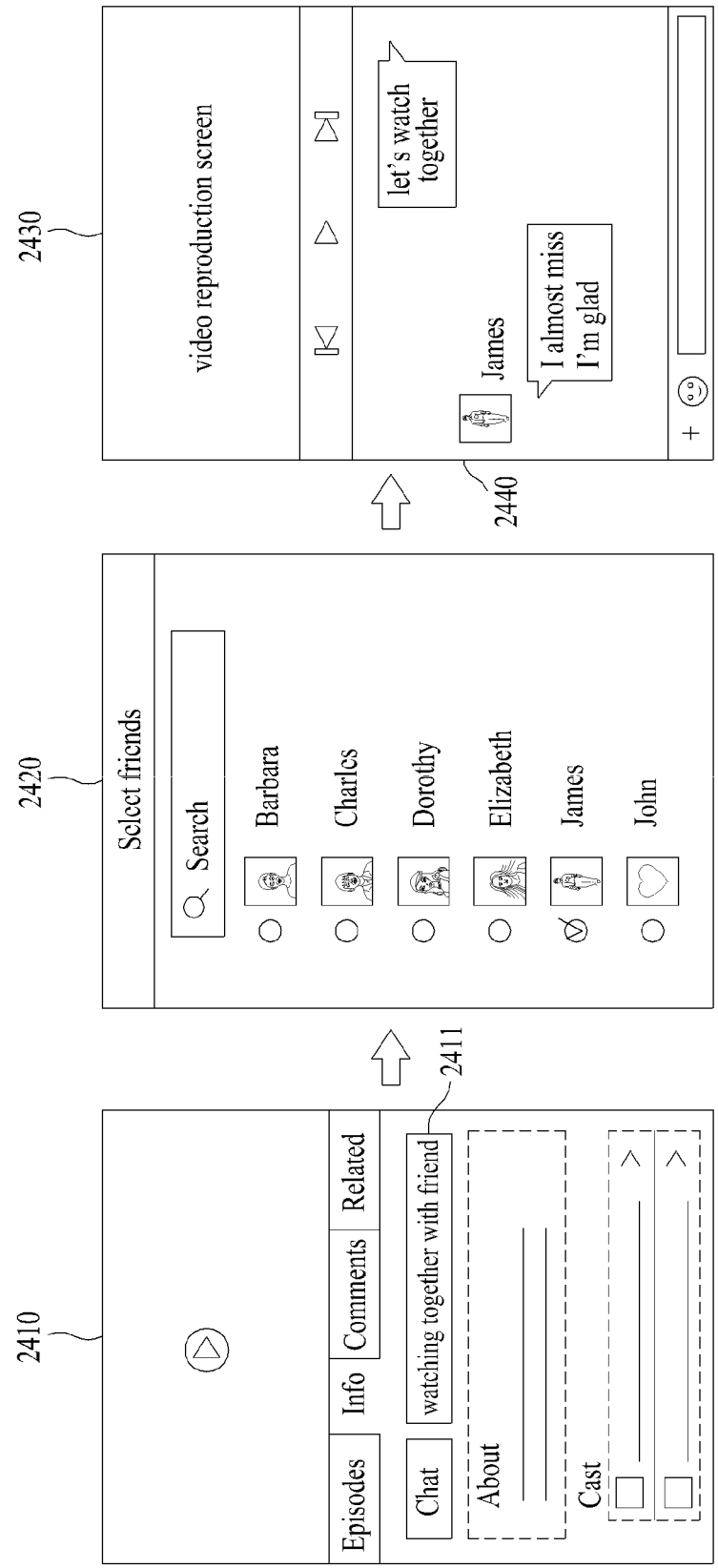
FIGS. 24 to 25 is a diagram schematically illustrating a function in which a user watches a video while chatting with a called specific friend or group at a video player screen.

FIG. 24 is a diagram schematically illustrating a function in which a user watches a video while chatting with a called specific friend or group at a video details page.

Referring to FIG. 24, a video details page 2410 may be to provide details information of a specific video selected by a user and may include a chatting menu 2411 for calling a chatting function of a messenger. If a user selects the chatting menu 2411 at the video details page 2410, the video details page 2410 may be switched into a messenger friend list screen 2420 for selecting a specific friend or group. If the user selects at least one friend from the messenger friend list screen 2420, a video reproduction screen 2430 and a conversation screen 2440 may be simultaneously displayed one screen in the form of screen division. As illustrated in FIG. 24, if the user calls a specific friend or group at the video details page 2410, a provision unit 213 may provide a function for displaying the video reproduction screen 2430 at a top end portion of the conversation screen 2440 and chatting with a friend while watching a video.

Figure 25:
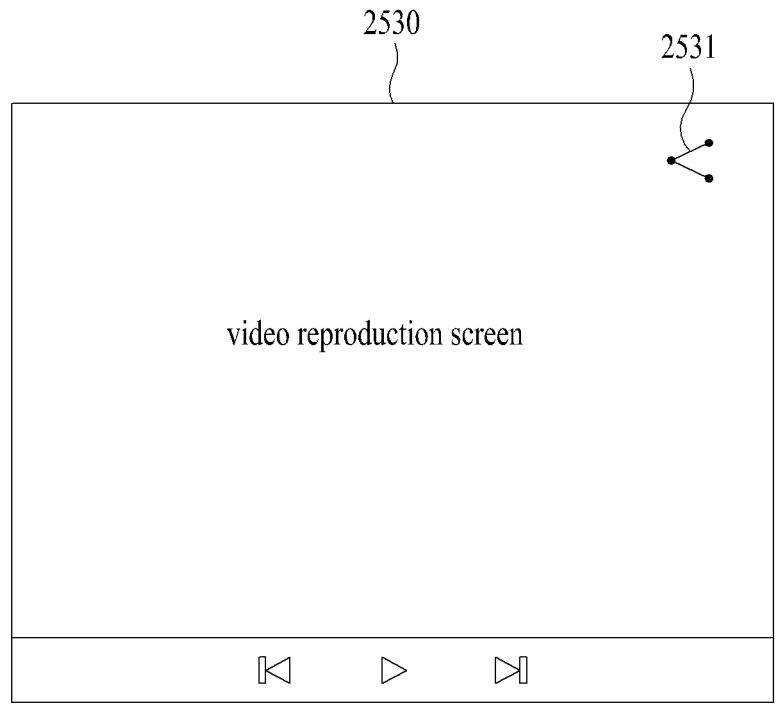
Figure 25:
Figure 25:
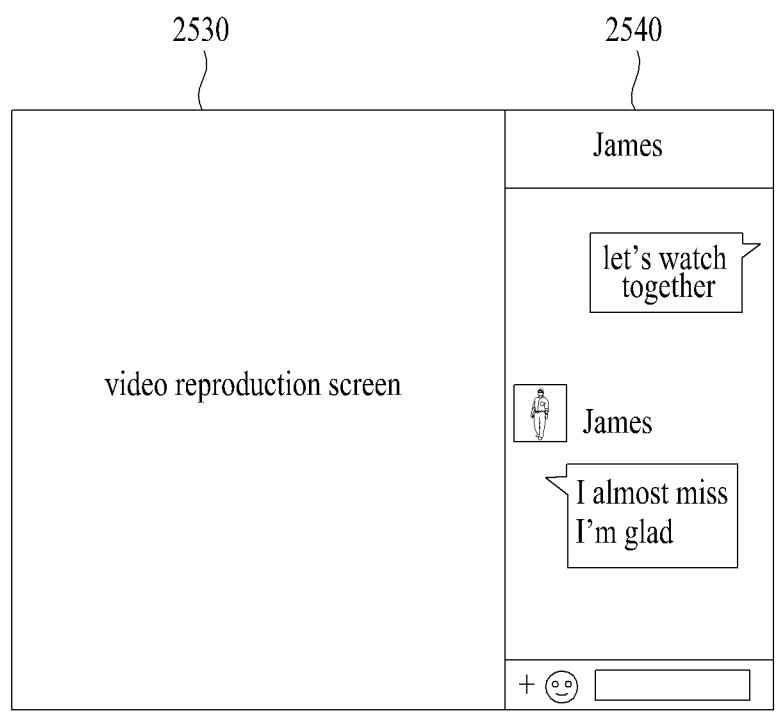

FIG. 25 is a diagram schematically illustrating a function in which a user watches a video while chatting with a called specific friend or group at a video player screen.

A video player screen 2530 of FIG. 25 may correspond to the case that a specific video selected by a user is reproduced by landscape. Referring to FIG. 25, the video player screen 2530 may include a chatting menu 2531 for calling a chatting function of a messenger. Likewise, a user may select a friend, which the user wants to watch a video, using the chatting menu 2531 at the video player screen 2530; if selection of a friend is completed, the video player screen 2530 and a conversation screen 2540 may be simultaneously displayed on one screen in the form of screen division. That is, a provision unit 213 may provide a function for inviting a messenger friend at a video player and watching a video while dialogizing.

In the above-described embodiment, in the case of providing a messenger friend list through a messenger API connected with the video details page or video player, the provision unit 213 may show a friend list in the order of the level of closeness formed at a messenger, thereby making it possible for a user to check a closeness ranking and select a friend with which the user wants to watch a video.

According to at least one example embodiment, information defining the screens shown in FIGS. 24-25 may be prepared by the contents providing system 100/200 and transmitted to the user terminal 101. The user terminal may display one, some or all of the screens illustrated in FIGS. 24-25 based on the information received at the user terminal 101 from the contents providing system 100/200.

Figure 26:
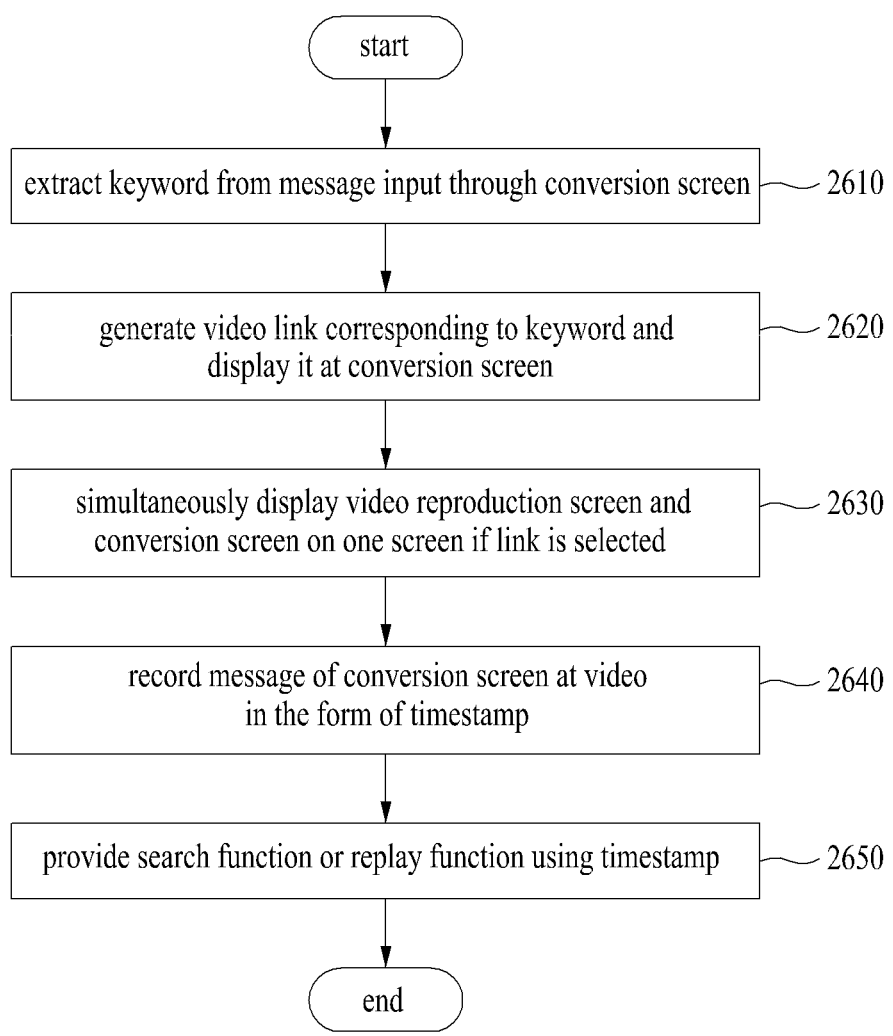
FIG. 26 is a flow chart schematically illustrating a method for providing a video in connection with a chatting, according to at least one example embodiment of the inventive concepts.

FIG. 26 is a flow chart schematically illustrating a method for providing a video in connection with a chatting, according to at least one example embodiment of the inventive concepts. Steps of a method for providing a video in connection with a chatting may be performed by a provision unit 213 being a component of a contents providing system 200 described with reference to FIG. 2.

In step 2610, a provision unit 213 may extract keywords associated with a video from a message input through a conversation screen of a messenger. Keywords associated with each video such as a program title, a character name, and the like may be defined and constructed in advance. In the case where a previously defined keyword is included in conversation contents, the provision unit 213 may extract the keyword.

In step 2620, the provision unit 213 may search for a video corresponding to the keyword to generate a link for an access to the found video, and may apply the link to the keyword of the message input at a conversation screen to display a result of applying the link. That is, the provision unit 213 may provide a function for immediately watching a video based on messenger conversation contents.

In step 2630, if a video link is selected at the conversation screen, the provision unit 213 may simultaneously display a video reproduction screen, in which there is reproduced a link-specified video in connection with a video player, and a conversation screen, in which conversation is in progress, on one screen. For example, the provision unit 213 may display the video reproduction screen and the conversation screen in the form of screen division such as PIP or simultaneously display the video reproduction screen and the conversation screen by overlapping them in the form of layer.

Operations 2640 to 2650 may be substantially same as those 2330 to 2340 described with reference to FIG. 23, and a description thereof may be thus omitted.

Figure 27:
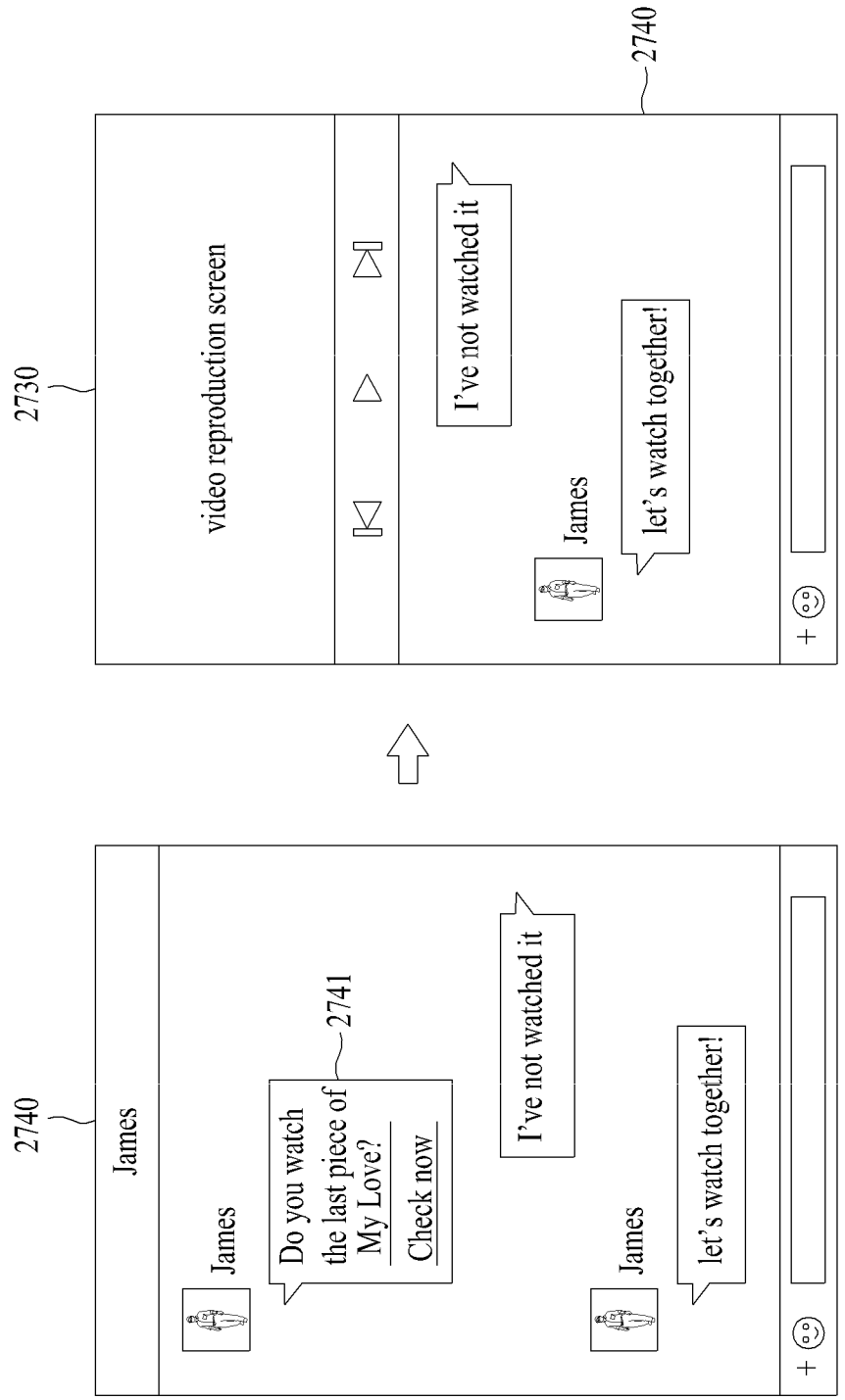
FIG. 27 is a diagram schematically illustrating a function for immediately watching a video based on messenger conversation contents.

FIG. 27 is a diagram schematically illustrating a function for immediately watching a video based on messenger conversation contents.

A conversation screen 2740 of FIG. 27 may illustrate an example of a messenger 2741 where a keyword associated with a video appears. Referring to FIG. 27, if a user or a friend makes mention of a specific program title or an actor name at the conversation screen 2740, a link for immediately watching an associated video may be automatically generated and applied to a corresponding message 2741. For example, if a user selects a video link at the conversation screen 2740, a video reproduction screen 2730 in which a link-specified video is reproduced may be displayed at a top end portion of the conversation screen 2740. Accordingly, the provision unit 213 may provide a function for generating a link for immediately watching a video based on conversation contents of a chat room, thereby allowing a user to watch a corresponding video together with a friend which the user chats with.

According to at least one example embodiment, information defining the screens shown in FIG. 27 may be prepared by the contents providing system 100/200 and transmitted to the user terminal 101. The user terminal may display one, some or all of the screens illustrated in FIG. 27 based on the information received at the user terminal 101 from the contents providing system 100/200.

Embodiments described with reference to FIGS. 24, 25, and 27 may be examples to provide a user interface for connecting a chatting and a video. A path or interface for watching a video together while chatting with the friend may be variously changed or modified. Furthermore, the path or interface for watching a video together while chatting with the friend may be configured more variously.

According to at least one example embodiment of the inventive concepts, it may be possible to provide a function for calling a chatting function at a video-associated page and a function for immediately watching a specific video at a conversation screen of the chatting function. This may allow a user to select a friend freely and to watch a video together with the selected friend while dialogizing.

Figure 28:
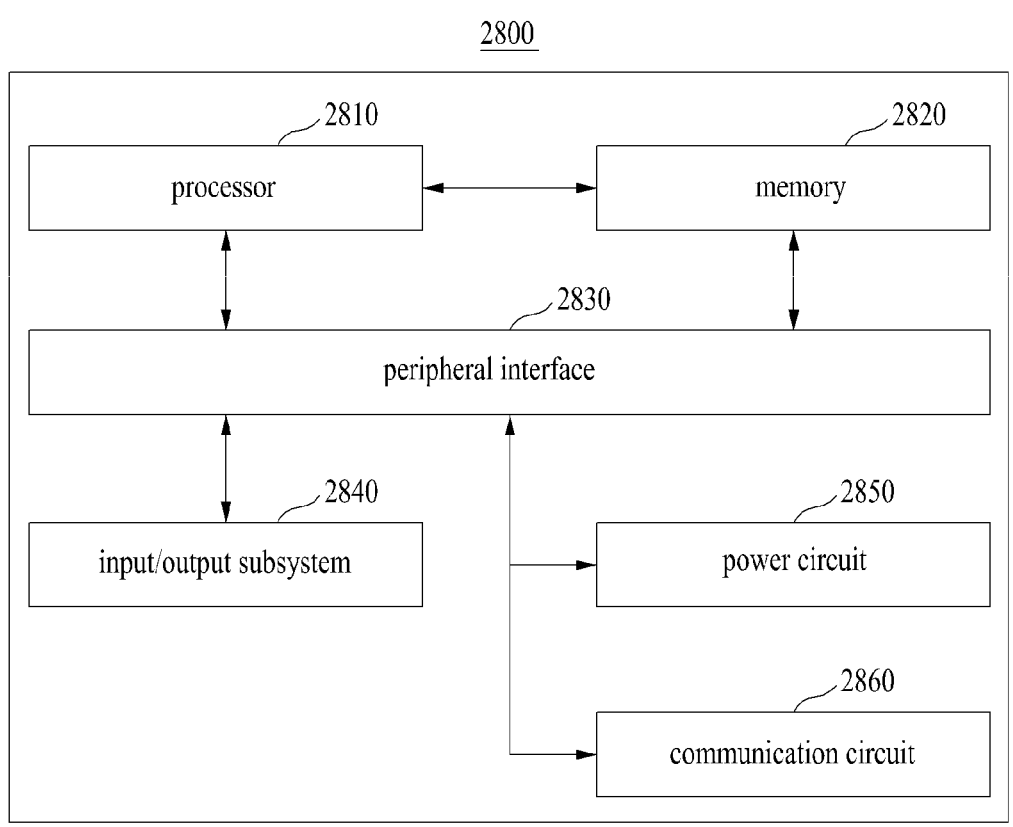
FIG. 28 is a block diagram schematically illustrating an internal configuration of a computer system according to at least one example embodiment of the inventive concepts.

FIG. 28 is a block diagram schematically illustrating an internal configuration of a computer system according to at least one example embodiment of the inventive concepts. A computer system 2800 may include at least one processor 2810, a memory 2820, a peripheral interface 2830, an input/output subsystem 2840, a power circuit 2850, and a communication circuit 2860. Here, the computer system 2800 may correspond to a user terminal (e.g., the user terminal 101).

For example, the memory 2820 may include a high-speed random access memory (RAM), a magnetic disc, a static RAM, a dynamic RAM, a read only memory (ROM), a flash memory, or a nonvolatile memory. The memory 2820 may include a software module, a command set, or a variety of data necessary for an operation of the computer system. The processor 2820 may control an access to the memory 2820 from the processor 2810 or any other component (e.g., the peripheral interface 2830).

The peripheral interface 2830 may couple a peripheral input and/or output device of the computer system 2800 to the processor 2810 and the memory 2820. The processor 2810 may execute a software module or a command set stored at the memory 2820 to perform a variety of functions for the computer system 2800 and to process data.

The input/output subsystem 2840 may couple a variety of peripheral input/output devices to the peripheral interface 2830. For example, the input/output subsystem 2840 may include a controller for coupling a monitor, a keyboard, a mouse, a printer, or a peripheral device, such as a touch screen or a sensor, to the peripheral interface 2830. According to another aspect, peripheral input/output devices may be coupled to the peripheral interface 2830 without passing through the input/output subsystem 2840.

All or a part of components of a terminal may be powered by the power circuit 2850. For example, the power circuit 2850 may include a power management system, one or more power sources such as a battery or an alternating current (AC), a charging system, a power failure detection circuit, a power converter or inverter, a power status indicator, or any other components for power generation, management, and distribution.

The communication circuit 2860 may communicate with other computer system using at least one external port. As described above, the communication circuit 2860 may include a RF circuit and may communicate with other computer system by transmitting and receiving an RF signal known as an electromagnetic signal.

The computer system 2800 illustrated in FIG. 28 is an example. The computer system 2800 may not include some of components illustrated in FIG. 28, may further include components not illustrated in FIG. 28, or may be implemented such that two or more components are combined. For example, the computer system 2800 for a mobile terminal of a communication environment may include a touch screen, a sensor, and the like as well as components illustrated in FIG. 28, and the communication 2860 may include circuits for RF communications such as wireless-fidelity (Wi-Fi), 3G, long term evolution (LTE), Bluetooth, near field communication (NFC), Zigbee, and the like. Components capable of being included in the computer system 2800 may be implemented with hardware, including an integrated circuit specialized for one or more signal processing or an application, software, or a combination thereof.

Methods according to at least one example embodiment of the inventive concepts may be implemented in the format of program instruction executable through various computer systems and may be recorded at a computer-readable medium.

A program according to at least one example embodiment of the inventive concepts may be a PC-based program or an application dedicated to a mobile terminal. An application for providing contents may be implemented in the format of in-app of a specific application (a social service application such as a messenger) or may be implemented so as to operate on a specific application.

Furthermore, methods according to at least one example embodiment of the inventive concepts may be executed on a user terminal controlled by an application for providing content. Such an application may be installed on a user terminal through a file which a file distribution system provides. For example, the file distribution system may include a file transfer unit (not illustrated) which transfers the file in response to a request of a user terminal.

As such, according to at least one example embodiment of the inventive concepts, a video service may be invigorated more and more through a new distribution path by constructing a video distribution platform on a social platform and providing a video service associated with the social network. According to at least one example embodiment of the inventive concepts, also, the quality of service may be improved more and more through service enhancement and a differentiated service by sharing video contents based on a social network. According to at least one example embodiment of the inventive concepts, it may be possible to effectively provide a video to world-wide friends in connection with a characteristic of a social service and to improve reliability of a user on a recommend video by recommending video contents based on levels of closeness and reaction according to a bilateral relationship. Furthermore, according to at least one example embodiment of the inventive concepts, a specialized service may be extended and provided through a business model in which a social platform is used. Also, according to at least one example embodiment of the inventive concepts, a new model of traffic may be attracted by providing pieces of associated contents at a social network-based contents distribution environment with respect to each piece of video contents, thereby making it possible to extend and diversify a service. Furthermore, it may be possible to implement a new service model in which a characteristic of a social platform is applied to multi-track video contents. This may mean that diffusion and sharing of a video are accelerated through service improvement and service competence is secured. According to at least one example embodiment of the inventive concepts, a service model may be implemented which freely connects a chatting and a video through combination of a social service and a video service, thereby making it possible for users to share videos more easily and conveniently. Consequently, it may be possible to improve service utilization and usability.

The units (or devices) described herein may be implemented using hardware components, software components, and/or a combination thereof. For example, devices and components described therein may be implemented using one or more general-purpose or special purpose computers, such as, but not limited to, a processor, a controller, an arithmetic logic unit (ALU), a digital signal processor, a microcomputer, a field programmable gate array (FPGA), a programmable logic unit, a microprocessor or any other device capable of responding to and executing instructions in a defined manner. A processing device may run an operating system (OS) and one or more software applications that run on the OS. The processing device also may access, store, manipulate, process, and create data in response to execution of the software. For the sake of easy understanding, at least one example embodiment of the inventive concepts is explained with reference to an example where one processing device is used; however, one skilled in the art will appreciate that a processing device may include multiple processing elements and multiple types of processing elements. For example, a processing device may include multiple processors or a processor and a controller. In addition, other processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to embodiments may be implemented in the format of program instruction executable through various computing devices and may be recorded in a computer-readable medium. The computer-readable medium may also include program instructions, data files, data structures, and the like independently or in the format of combination. The program instructions recorded in the medium may be those specially designed and constructed for the embodiment or may be well-known and available to those skilled in the computer software arts. Examples of the computer-readable medium may include magnetic media such as hard disks, floppy disks, and magnetic tape; optical media such as CD ROM disks and DVD; magneto-optical media such as floptical disks; and hardware devices that are specialized to store and perform program instructions, such as read-only memory (ROM), random access memory (RAM), flash memory, and the like. Examples of program instructions may include both machine code produced by a compiler and high-level code executed by the computer using an interpreter. The described hardware devices may be configured to operate as one or more software modules to perform the operations of the above-described embodiments, and vice versa Although being described with reference to specific examples and drawings, modifications, additions and substitutions on embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A contents providing system comprising:
a memory storing computer-readable instructions; and
one or more processors configured to execute the instructions to,
manage information on a social network of a social service;
provide a conversation screen to a first terminal of a user, the conversation screen being a screen for facilitating chatting between the user and a conversation partner;
extract a keyword received from the first terminal via the conversation screen, the keyword being a predetermined keyword associated with at least one video content, wherein the keyword is automatically extracted in response to a message including the keyword being inputted into a conversation session associated with the conversation screen;
identify at least one video content associated with the extracted keyword;
generate a link corresponding to the identified at least one video content;
insert the link in the conversation session associated with the conversation screen being provided to the first terminal, wherein the link is inserted in the message by applying the link to the keyword of the message such that the keyword is link text of the link, and the message is displayed on the conversation screen such that the keyword is visually distinguishable in the message; and
in response to receiving a selection of the link from the first terminal,
provide a together-watching screen to the first terminal, the together-watching screen being a screen that includes, simultaneously, the conversation screen and a video reproduction screen in which the identified at least one video content are reproduced,
wherein the one or more processors are configured to execute the instructions to record a textual conversation message exchanged with the conversation partner while the at least one video content is reproduced at the video reproduction screen in a form of a timestamp,
wherein the one or more processors are configured to execute the instructions to provide a search function,
wherein the search function includes using the textual conversation message recorded as the timestamp to search for an image section, from the at least one video context, corresponding to a point in time when the textual conversation message recorded as the timestamp was input, and
wherein the contents providing system is separate from the first terminal, and the contents providing system is configured to send data to, and receive data from, the first terminal via a wired or wireless network.

2. The contents providing system of claim 1, wherein the one or more processors are configured to execute the instructions to,
provide the at least one video content through the social service using the social network, and
share a video, corresponding to a separate unit or a list unit, from among videos provided to the user through a chat room with at least one different person related to the user.

3. The contents providing system of claim 2, wherein the one or more processors are configured to execute the instructions to provide a video, having an interaction history by a different person related to the user, as recommended content.

4. The contents providing system of claim 2, wherein the one or more processors are configured to execute the instructions to,
- calculate a level of closeness with a different person related to the user based on information associated with the social network, and
- provide a video having an interaction history by a different person, selected according to the level of closeness, from among the different persons as recommended contents or display a video list to be provided to the user in an order of video having an interaction history by a different person with a highest level of closeness.

5. The contents providing system of claim 2, wherein the one or more processors are configured to execute the instructions to,
- provide a concurrent user list on the at least one video content, and
- discriminately display different persons of the concurrent users list related to the user.

6. The contents providing system of claim 1, wherein the one or more processors are configured to execute the instructions to,
- provide the at least one video content through the social service using the social network,
- perform a purchasing process on the at least one video content selected by the user, and
- provide benefit information associated with the at least one video content if the purchasing process is completed.

7. The contents providing system of claim 6, wherein the one or more processors are configured to execute the instructions to provide, as a benefit, at least one of a function for hastening a contents loading time of the at least one video content, a function for extending an available period of the at least one video content, or a function for sharing the at least one video content with at least one different person related to the user at the social service, as a benefit.

8. The contents providing system of claim 6, wherein the one or more processors are configured to execute the instructions to provide advertisement information together with the benefit information, and
- the advertisement information including one or more advertisements associated with the at least one video content or one or more randomly extracted advertisements.

9. The contents providing system of claim 6, wherein the one or more processors are configured to execute the instructions to provide the benefit information when an advertisement shown through the purchasing process is consumed by the user.

10. The contents providing system of claim 1, wherein the one or more processors are configured to execute the instructions to,
- provide the at least one video content through the social service using the social network, and
- display additional content associated with the at least one video content on a contents page in which information on the at least one video content is included.

11. The contents providing system of claim 10, wherein the one or more processors are configured to execute the instructions to display information on an image-type expression used for communication between users at the social service, as the additional content.

12. The contents providing system of claim 10, wherein the one or more processors are configured to execute the instructions to display, as the additional content, information on an official account, the official account being an account for providing information associated with the at least one video content at the social service.

13. The contents providing system of claim 10, wherein the one or more processors are configured to execute the instructions to display product advertisement associated with the at least one video content as the additional content.

14. The contents providing system of claim 10, wherein the one or more processors are configured to execute the instructions to,
- determine levels of closeness between the user and a plurality of people, using information associated with the social network, and
- display additional contents based on interaction histories of the plurality of people, in accordance with the determined levels of closeness.

15. The contents providing system of claim 1, wherein the one or more processors are configured to execute the instructions to,
- provide the at least one video content through the social service,
- provide video contents formed of a multi-track video, and
- display a track list of the multi-track video.

16. The contents providing system of claim 15, wherein the one or more processors are configured to execute the instructions to display a list of different persons, having an interaction history on each track, from among different persons related to the user, with respect to each of tracks of the track list.

17. The contents providing system of claim 15, wherein the one or more processors are configured to execute the instructions to,
- calculate a level of closeness with a plurality of people related to the user, using information associated with the social network, and
- display the track list of the multi-track video, the track list in an order that is based on first people, from among the plurality of people, who have interacted with tracks on the track list and levels of closeness of the first people or recommends a track, from among tracks of the track list of the multi-track video, that has been interacted with by at least one different person selected according to a level of closeness.

18. The contents providing system of claim 15, wherein the one or more processors are configured to execute the instructions to display a list of different persons, having an interaction history on each track, from among different persons related to the user, when the track list of the multi-track video includes at least two or more individual tracks.

19. The contents providing system of claim 15, wherein the one or more processors are configured to execute the instructions to simultaneously provide a video of a track selected by the user and a video of a track selected by at least one different person related to the user in the multi-track video.

20. A contents providing method which is implemented with a computer and distributes video contents at a contents platform constructed on a social platform providing a social service, the contents providing method comprising:
- managing information on a social network of the social service;
- providing, by a contents providing system, a conversation screen to a first terminal of a user, the conversation screen being a screen for facilitating chatting between the user and a conversation partner;
- extracting, by the contents providing system, a keyword received from the first terminal via the conversation screen, the keyword being a predetermined keyword associated with at least one video content, wherein the keyword is automatically extracted in response to a message including the keyword being inputted into a conversation session associated with the conversation screen;

identifying, by the contents providing system, at least one video content associated with the extracted keyword;

generating, by the contents providing system, a link corresponding to the identified at least one video content;

inserting, by the contents providing system, the link in the conversation screen being provided to the first terminal, wherein the link is inserted in the message by applying the link to the keyword of the message such that the keyword is link text of the link, and the message is displayed on the conversation screen such that the keyword is visually distinguishable in the message;

in response to receiving a selection of the link from the first terminal,
  providing, by the contents providing system, a together-watching screen to the first terminal,
  the together-watching screen being a screen that includes, simultaneously, both the conversation screen and a video reproduction screen in which the identified at least one video content are reproduced;

recording a textual conversation message exchanged with the conversation partner while the at least one video content is reproduced at the video reproduction screen in a form of a timestamp; and providing a search function, wherein the search function includes using the textual conversation message recorded as the timestamp to search for an image section, from the at least one video content, corresponding to a point in time when the textual conversation message recorded as the timestamp was input, and wherein the contents providing system is separate from the first terminal, and the contents providing system is configured to send data to, and receive data from, the first terminal via a wired or wireless network.

21. The contents providing method of claim 20, further comprising:
  providing the at least one video content through the social service using the social network,
  wherein the providing includes sharing a video, corresponding to a separate unit or a list unit, from among videos provided to the user through a chat room with at least one different person related to the user.

22. The contents providing method of claim 20, further comprising:
  providing the at least one video content through the social service using the social network,
  wherein the providing includes performing a purchasing process on the at least one video content selected by the user and providing benefit information associated with the at least one video content if the purchasing process is completed.

23. The contents providing method of claim 20, further comprising:
  providing the at least one video content through the social service using the social network,
  wherein the providing includes displaying additional contents associated with the at least one video content on a page in which information on the at least one video content is included.

24. The contents providing method of claim 20, further comprising:
  providing the at least one video content through the social service using the social network, and
  wherein the providing includes providing video contents formed of a multi-track video, a track list of the multi-track video being displayed.

25. A contents providing method implemented with a computer, comprising:
  displaying a list of different persons related to a user according to a social network of a social service, at a terminal of the user;
  sending a selection of at least one conversation partner in the list of different persons, from the terminal to a contents providing system;
  receiving a conversation screen for chatting with the at least one conversation partner at the terminal from the contents providing system;
  displaying the received conversation screen at the terminal;
  receiving input of message of a conversation session at the terminal via the conversation screen, the conversation session being associated with the conversation screen, the message including a keyword, the keyword being a predetermined keyword associated with at least one video content;
  sending the keyword to the contents providing system;
  receiving, at the terminal from the contents providing system, a link corresponding to first at least one video content, the first at least one video content being at least one video content that corresponds to the sent keyword, the link being received at the terminal via the conversation screen as a link that has been applied to the keyword in the message of the conversation session such that the keyword is link text of the link, the message being displayed on the conversation screen such that the keyword is visually distinguishable in the message;
  receiving a selection of the link at the terminal via the conversation screen;
  sending an indication that the link was selected from the terminal to the contents providing system;
  receiving, at the terminal from the contents providing system, a together-watching screen; and
  displaying the together-watching screen,
    the together-watching screen being a screen that includes, simultaneously, both the conversation screen and a video reproduction screen in which the first at least one video content are reproduced,
  wherein the terminal is separate from the contents providing system, and the terminal is configured to send data to, and receive data from, the contents providing system via a wired or wireless network,
  wherein a textual conversation message exchanged with the at least one conversation partner in the conversation session is recorded while the first at least one video content is reproduced at the video reproduction screen in a form of a timestamp,
  wherein the method further comprises:
  providing a search function, and wherein the search function includes using the textual conversation message recorded as the timestamp to search for an image section, from the at least one video content, corresponding to a point in time when the textual conversation message recorded as the timestamp was input.

26. The contents providing method of claim 25, further comprising:
    displaying benefit information or additional contents associated with the at least one video content at the terminal of the user.

27. The contents providing method of claim 25, wherein the displaying of the received conversation screen comprises:
    displaying a track list of a multi-track video if the at least one video content is formed of the multi-track video.

28. The contents providing system of claim 1, wherein the one or more processors are configured to execute the instructions to provide the search function using the timestamp and a replay function on the at least one video content and the conversation message, the replay function including displaying the conversation message in synchronization with the at the first at least one video content.

29. The contents providing system of claim 1, wherein the conversation screen is a screen for displaying the chatting between the user and the conversation partner.

30. The contents providing method of claim 20, further comprising:
    providing a replay function, the replay function including displaying the conversation message in synchronization with the at the first at least one video content.

31. The contents providing method of claim 20, wherein the conversation screen is a screen for displaying the chatting between the user and the conversation partner.

32. The contents providing method of claim 25, further comprising:
    providing a replay function, the replay function including displaying the conversation message in synchronization with the at the first at least one video content.

33. The contents providing method of claim 25, wherein the conversation screen is a screen for displaying the chatting between the user and the conversation partner.

* * * * *